United States Patent [19]
Finney

[11] Patent Number: 5,464,320
[45] Date of Patent: Nov. 7, 1995

[54] SUPERVENTURI POWER SOURCE

[76] Inventor: Clifton D. Finney, 1057 Oak Hills Pkwy., Baton Rouge, La. 70810

[21] Appl. No.: 219,192

[22] Filed: Mar. 28, 1994

Related U.S. Application Data

[63] Continuation-in-part of Ser. No. 74,023, Jun. 2, 1993, abandoned.

[51] Int. Cl.$^6$ .................... F03D 1/02; F03D 1/04
[52] U.S. Cl. .................... 415/60; 415/4.3; 415/4.5; 415/220
[58] Field of Search ................ 415/2.1, 3.1, 4.1, 415/4.3, 4.5, 905, 906, 908, 60, 219.1, 220, 221

[56] References Cited

U.S. PATENT DOCUMENTS

| | | |
|---|---|---|
| 381,373 | 4/1888 | Herschel . |
| 1,345,022 | 6/1920 | Oliver . |
| 1,783,669 | 12/1930 | Oliver . |
| 2,330,907 | 10/1943 | Odor et al. ................ 415/4.3 |
| 4,070,131 | 1/1978 | Yen . |
| 4,166,596 | 9/1979 | Mouton, Jr. et al. ........... 415/2.1 |
| 4,320,304 | 3/1982 | Karlsson et al. . |

FOREIGN PATENT DOCUMENTS

| | | | |
|---|---|---|---|
| 26223 | 4/1923 | France .................. 415/4.5 |
| 866053 | 6/1941 | France .................. 415/2.1 |
| 891697 | 3/1944 | France . |
| 2518405 | 11/1976 | Germany ................. 415/2.1 |
| 527585 | 1/1955 | Italy .................... 415/4.3 |

OTHER PUBLICATIONS

W. H. Rae and A. Pope, "Low–Speed Wind Tunnel Testing," 2nd ed., (John Wiley, N.Y., 1984), pp. 5–36.
R. E. Sprenkle on *Venturi Tube* in "McGraw–Hill Encyclopedia of Science and Technology," (N.Y., 1987), vol. 19, pp. 188–189.
F. G. Bailey on *Turbine* in "McGraw–Hill Encyclopedia of Science and Technology," (New York, 1992) vol. 18, p. 618.

*Primary Examiner*—Edward K. Look
*Assistant Examiner*—James A. Larson

[57] ABSTRACT

A superventuri power source comprises: (i) a series of at least two venturi tubes with at least one twosome of the tubes labeled an alpha- and a beta-venturi tube, respectively, and of predetermined successively increasing flow capacity, respectively; (ii) the alpha-venturi tube having an open entrance and an open exit to permit flow through the open entrance and out of the open exit; (iii) respective inlets of the twosome each facing the intended direction of flow; (iv) the open exit of the alpha-venturi tube placed adjacent the throat of the beta-venturi tube so that respective central axes of the twosome essentially merge into a central super-axis along an intended line of flow; (v) as referenced from the super-axis, the inlets of the alpha- and beta-venturi tubes being positioned to intercept relatively inner and outer portions of a selected medium as an alpha- and a beta-flow, respectively, whereby alpha-flow as exhaust from the open exit of the alpha-venturi tube joins accelerated beta-flow adjacent the throat of the beta-venturi tube; and (vi) a beta-turbine adjacent the throat of the beta-venturi tube wherein the beta-turbine includes at least one impulse blade with radial length less than about three-fourths the minimal distance between the central super-axis and the closest limit of the throat of the beta-venturi tube to recover useful rotary mechanical power.

20 Claims, 8 Drawing Sheets

SUPERVENTURI POWER SOURCE

BACKGROUND—CROSS-REFERENCE TO RELATED APPLICATION

The present work is a continuation-in-part application of an application entitled a "Superventuri Power Source," filed Jun. 2, 1993 under application Ser. No. 08/074,023 and now abandoned.

BACKGROUND—FIELD OF INVENTION

This invention relates to enhanced power recovery from the flow of a selected medium employing a superventuri power source comprising a series of at least two venturi tubes as an accelerator with a turbine adjacent the throat of at least one venturi tube in a stage subsequent to the first.

BACKGROUND—DESCRIPTION OF PRIOR ART

A velocity-cubed term dominates the Newtonian equation for the concentrated power available from a parcel of flow in a selected medium. Terms for the parcel include its power, $P_m$, in $$P_m = \frac{1}{2} \rho A u^3 \qquad \text{(EQN. 1)}$$

watts; its density, $\rho$, in kilograms per cubic meter; its normal cross-sectional area perpendicular to the direction of flow, $A$, in square meters; and its velocity along the direction of flow, $u$, in meters per second.

EQN. 1 has helped guide the invention of modern turbines, engines, and the like employing flowing selected media as diverse as air in a wind, hot vapors such as steam, gaseous products of combustion such as carbon dioxide and water, a stream of liquid water, and plasmas such as an ion beam. Not even a nuclear power reactor is an exception to the influence of EQN. 1 although Einstein's relationship for the equivalence of mass and energy guided its invention. This is true because the concentrated power from the core of a nuclear reactor is normally converted to steam or another relatively standard selected medium.

However, there are genuine exceptions to the Newtonian path of Eqn. 1. Notable among these is the photo-voltaic cell for converting a flow of sunlight directly to electric power. Here, Einstein's relationship for the photo-electric effect, among others, has helped guide invention and development. Prime obstacles to implementation of the technology relate to the technical difficulties and costs associated with concentrating sunlight and with developing efficient solar cells.

Too, there are well-known environmental hazards associated with some forms of energy used in technologies associated with EQN 1. At a basic level of understanding, these hazards commonly involve the predictable second law mixing of chemical or radiative effluvia into the surroundings.

Since technologies based upon EQN. 1 are difficult to circumvent because of the concentrated power they are capable of providing on the one hand, and they are sometimes difficult to work with because of the environmental problems they may cause on the other hand, another approach to power sources has been an attempt to enhance the velocity term of EQN. 1 for suitable selected media. For example, Yen in U.S. Pat. No. 4,070,131 dated Jan. 24, 1978 described a tornado-type wind turbine. The purpose of the device was to convert internal energy of ordinary winds to kinetic energy of hurricane force winds to drive a turbine.

Yen's and similar approaches employ the Bernoulli equation as a guide. The Bernoulli equation may be taken as practical statement in conservation of energy applied at two or more points along a flow stream. Typically, it includes a term for kinetic energy in the form of the product of mass and the square of flow velocity, a term for internal energy in the form of the product of pressure and volume, and as well, a term for potential energy in the form of the product of mass, gravity, and height. The sum of terms for kinetic energy, internal energy, and potential energy are taken to be constant at each point of analysis along a flow stream.

For the case of a horizontal or relatively flat apparatus such as Yen's tornado-type wind turbine, or even a venturi tube, terms in the Bernoulli equation for potential energy may cancel requiring, in a first approximation, only terms involving kinetic and internal energy. Accordingly, Yen pointed out, that for a wind of fifteen miles per hour (6.7 meters per second), the ratio of kinetic energy of flow to pressure-volume internal energy is only about 0.03 percent. In other words, there is internal energy to spare for conversion to enhanced kinetic energy of flow.

However, the venturi tube does provide a surer approach to the problem of converting internal energy to enhanced kinetic energy of a flowing selected medium. Herschel in U.S. Pat. No. 381,373 dated Apr. 17, 1888 set forth appropriate dimensions for a venturi tube such as lengths, angles, and fillet radii. The information has been updated as presented by Sprenkel in the *McGraw-Hill Encyclopedia of Science and Technology*. A venturi tube may be regarded as including a central axis through a substantially hollow conduit having a venturi constriction. The venturi constriction includes an inlet of nonzero length and generally decreasing normal cross-sectional area which leads to a throat of generally minimal normal cross-sectional area which, in turn, leads to an outlet of nonzero length and generally increasing normal cross-sectional area. Here, each normal cross-sectional area is taken to be perpendicular to the central axis of the tube. For purposes of simplified presentation, except as noted, discussion is initially confined to venturi tubes which are externally and internally annular, and which have equal maximal diameters for inlets and outlets, respectively.

The continuity equation is a good starting point for understanding enhancement of flow velocity of a selected medium in a venturi tube. Assuming a constant density for the selected medium, the continuity equation may be taken as a statement in conservation of mass applied at two or more points along a flow stream. Typically, it employs a term for the product of flow velocity and normal cross-sectional area with the term being constant at each point of analysis along the flow.

Therefore in a venturi tube, the flow velocity at the throat is elevated because the minimal normal cross-sectional area of the throat is less compared to the maximal normal cross-section areas of the inlet and outlet, respectively. More specifically we may define the contraction ratio of a venturi tube as the ratio between maximal normal cross-sectional area of the inlet and the minimal normal cross-sectional area of the throat. From the continuity equation, the product of contraction ratio and incident flow velocity of a selected medium at the inlet gives the expected velocity at the throat.

With a contraction ratio of eight-to-one, an eight-fold increase in velocity of a selected medium would be expected. Indeed, this order of enhancement is routinely realized in wind tunnels which feature the throat of a venturi tube as a high velocity test section. However, as described in the monograph by Rae and Pope on *Low-Speed Wind Tunnel Testing*, the task requires essentially laboratory conditions with elaborate measures to control flow including a regulated fan, turning vanes and honeycombs.

The Bernoulli equation provides an additional important insight on the details of the mechanism of energy conversion in technologies which feature a venturi tube. Since the velocity of a selected medium is generally higher adjacent the throat relative to that elsewhere in a venturi tube, the pressure adjacent the throat is lower. Thus, in the wind tunnel internal energy in the form of pressure-volume work of ordinary fan-driven winds is converted to kinetic energy in the form of the high velocity in hurricane force winds. As well, the existence of a pressure differential has meant that venturi tubes could be effectively employed in other technologies such as meters to measure flow rates and carburetors to mix selected media.

Notwithstanding these successes, there are fundamental drawbacks which hinder the use of venturi tubes in power sources. Ideally, for example, a wind turbine might be positioned adjacent the throat of a large venturi tube to simultaneously decrease rotor diameter and increase velocity relative to a standard, open wind turbine. With a contraction ratio of three-to-one, a three-fold increase in wind velocity would be expected. When something approaching a steady real wind is employed, however, the observation of a 1.5-fold increase in velocity might be fortuitous. The reduction in efficiency of a venturi tube under real conditions may be attributed to effects such as turbulence, viscosity and drag.

The efficiency factor of a venturi tube in reference to throat velocity may be defined as the ratio of the throat velocity of a selected medium observed in experiment to the throat velocity of the selected medium expected from application of the continuity equation. In the previous example, where a 1.5-fold increase was observed and a three-fold increase was expected, the efficiency factor was 0.50.

Of greater interest is the power amplification factor for a venturi tube. This may be defined from EQN. 1 as the ratio between the power available from a selected medium in the minimal normal cross-sectional area of the throat and the power available from the selected medium in the maximal normal cross-sectional area of the inlet. Assuming constant density, terms include: the $$F_p = \frac{A_t u_t^3}{A_i u^3} \quad \text{(EQN. 2)}$$

power amplification factor, $F_p$, in dimensionless units; the minimal throat and maximal inlet normal cross-sectional areas, $A_t$ and $A_i$, respectively, in square meters; and the actual throat and inlet velocities, $u_t$ and $u$, respectively, in meters per second. Thus, in the previous example with $A_t=1$ and $A_i=3$ and with $u_t=1.5$ and $u=1$, then $F_p=1.125$. A power amplification factor so close to unity indicates that there is little advantage in a venturi tube having this kind of efficiency factor for throat velocity. In other words, a standard, open turbine having a blade diameter equal to the maximal diameter of the inlet of the proposed venturi tube, would instead by itself probably present more attractive economics.

However, a power amplification factor substantially greater than unity for a venturi tube would be of significance because of the following factors. Firstly, internal energy converted to kinetic energy and available at the throat would mean, in principle, that up to some limit, the effective efficiency of any turbine operating at the throat would be increased in an amount proportional to the power amplification factor. Secondly, the size and thereby cost of a turbine blade required to produce a given amount of power could be greatly reduced.

Karlsson and Raimel in U.S. Pat. No. 4,320,304 dated Mar. 16, 1982 addressed the issue of reducing turbulence in an improved venturi tube having a series of annular slots between the inlet and outlet with the slots assumed to be acting as vents for turbulent media. With the apparatus in their FIG. 6, they were able to report up to about a 1.9-fold increase in velocity and a 6.7-fold increase power over an unenshrouded turbine when the selected medium was a wind of five meters per second. The apparatus also exhibited increased sensitivity at lower wind speeds. However, these gains came at the expense of a high contraction ratio of approximately 19 to 1, a low velocity efficiency factor of about 0.10, and a very low power amplification factor of only about 0.35. Although the absolute gains in velocity, power, and sensitivity are of technical interest, the reduced values for velocity efficiency and the power amplification factors argue against attractive economics.

The first of the modern superventuri apparatus as reported by Bloch in French Brevet Patent 891,697 dated Mar. 15, 1944 provides a yet surer approach to the problem of converting internal energy to enhanced kinetic energy for a flowing selected medium. Informally, a superventuri apparatus is a series-type accelerator wherein exhaust from the exit of a smaller capacity first-stage venturi tube is pumped with the low pressure, accelerated flow adjacent the throat of a larger capacity second-stage venturi tube. In turn, the exhaust from the exit of the second-stage venturi tube may be pumped with the low pressure, accelerated flow adjacent the throat of a still larger capacity third-stage venturi tube, and so on.

A more formal definition of a superventuri apparatus will be presented in sections which follow and in the appended claims. In this regard perhaps it worth mentioning now that a first-stage venturi tube may be labeled an alpha-venturi tube in relation to a second-stage venturi tube labeled as a beta-venturi tube. However, a second-stage venturi tube may also be labeled an alpha-venturi tube in relation to a third-stage venturi tube labeled as a beta-venturi tube.

An analysis of serial pumping action in a superventuri apparatus begins by understanding that each of the venturi tubes, when tested by itself in a flowing selected medium, exhibits its own first drop in pressure adjacent its respective throat. When a second-stage venturi tube is coupled to a first-stage venturi tube to form a superventuri apparatus with two stages, the throat of the first-stage venturi tube undergoes a second drop in pressure due to the pumping action adjacent the throat of the second-stage venturi tube. When a third-stage venturi tube is added to the previous two tubes to form a superventuri apparatus with three stages, the throat of the second-stage venturi tube undergoes a second drop in pressure from the pumping action adjacent the throat of the third-stage venturi tube. Now, however, and this a key point, the throat of the first-stage venturi tubes undergoes a third drop in pressure from the incremental pumping action of the second drop in pressure at the throat of the second stage venturi tube.

In summary, in a superventuri apparatus with two stages, the throat of the first-stage venturi tube undergoes two drops in pressure and the throat of the second-stage venturi tube undergoes one drop in pressure. In a superventuri apparatus with three stages, the throat of the first-stage venturi tube undergoes three drops in pressure, the throat of the second-stage venturi tube undergoes two, and the throat of the third-stage venturi tube undergoes one. Of course, accompanying each drop in pressure is an incremental increase in velocity of the selected medium at the respective throat. Hence, it was Bloch's approach to place a turbine of reduced diameter adjacent the throat of the first-stage or smallest venturi tube of a superventuri apparatus to form a superventuri power source so that the velocity of a selected medium was at its highest point. In this manner the problems of turbulence, drag, and viscosity associated with the use of a venturi tube as a power source might be overcome.

On a point of nomenclature herein, when a superventuri apparatus such as Bloch's comprised of venturi tubes is then combined with a power conversion means such as a turbine adjacent the throat of a venturi tube, then the combination becomes a superventuri power source.

It is also worth noting that Bloch illustrated a preferred sequence of venturi tubes wherein contraction ratio decreased while stage number and flow capacity increased. A more detailed explanation of this point follows in another section.

A fundamental weakness in Bloch's approach may be illustrated with some recent data on a local superventuri power source somewhat similar to Bloch's but having only two stages with a turbine adjacent the throat of the first stage. A more detailed technical description of the superventuri power source will be presented in the following sections. At this juncture, it is sufficient to know that the first-stage venturi tube had a contraction ratio of 4.0 with a maximal inlet diameter of 0.20 meter, and the second-stage venturi tube had a contraction ratio of 2.14 with a maximal inlet diameter of 0.45 meter. The selected medium was wind in the range of 4.4–4.6 meters per second in a tunnel 0.61 meter in diameter and 2.4 meters long.

When the first- and second-stage venturi tubes were tested separately, they had throat velocities which were 1.84- and 1.56-times the tunnel velocity, respectively. Accordingly, the first-stage venturi tube taken alone had a power amplification factor of 1.6. When the first-stage venturi tube was backed by the second-stage venturi tube in a superventuri power source, the throat velocity of the first-stage venturi tube was enhanced to 2.55-times the tunnel velocity and the power amplification factor of the first-stage venturi tube jumped to 4.1.

However, the enhanced power amplification factor of the first-stage venturi tube is illusory because it was calculated using parameters entirely associated with that venturi tube. Such a calculation failed to take into account the increased normal cross-sectional area of the second-stage venturi tube. When instead, the power amplification factor in EQN. 2 was calculated more realistically using the throat parameters of the first-stage venturi tube and the inlet parameters of the second-stage venturi tube, the power amplification factor declined to 0.83. Thus, even though the enhancement of velocity in the first-stage venturi tube was scientifically and technically interesting, it did not fulfill the requirements for a power source along these lines, which among other characteristics, should have a power amplification factor greater than unity. In other words a standard, open wind turbine having the diameter of the second-stage venturi tube would have a power amplification factor of one and would presumably present more attractive economics for power production.

Other superventuri power sources described in the literature, whether they were more primitive or more modern than Bloch's, had similar deficiencies. On the more primitive side, Jourdain in French Patent 26,223 dated Apr. 24, 1923 described a superventuri power source with three stages having a standard turbine adjacent the throat of each venturi tube. On the more modern side, Lavergne in French Patent 866,053 dated Jun. 6, 1941 together with Mouton and Thompson in U.S. patent dated Sep. 4, 1979 each described a superventuri power source with two stages having a turbine or turbines adjacent the throat of the first-stage venturi tube only. However, the latter work remains of continuing interest because of its lighter-than-air approach.

POINT OF INVENTION

The thrust of the current invention is, to be viable, a superventuri power source must have a turbine adjacent the throat of at least one venturi tube in a stage subsequent to the first. Thus, in the most basic superventuri power source having two stages, the second-stage venturi tube exhibits a dual action adjacent its throat. It pumps on the exhaust of the first-stage venturi tube and simultaneously converts available flow power to more useful rotary mechanical power. Since any single action such as pumping or power conversion, when taken alone, usually proceeds at an efficiency less than unity, a combination of actions tends to promote higher efficiency for the entire apparatus. That is, power lost to inefficiency of the turbine in the second stage is still available for pumping on the first-stage and vice versa.

In the process of exploring the notion of power conversion in a stage subsequent to the first, there was a pleasant experimental surprise. It was found that performance improved when the blade of an impulse turbine was abbreviated to a radial length between its top and bottom approximating half the difference between the minimal diameter for the throat of the beta-venturi tube and the maximal diameter for the open exit of the alpha-venturi tube. In less restrictive terms this result may be translated to a general condition of an impulse blade comprising a top and a bottom with the radial length between the top and the bottom being less than about three-fourths the minimal distance between the central superaxis of the superventuri apparatus and the closest limit of the throat of the beta-venturi tube.

Thus, no single impulse blade need have a radial length approaching the normal radius of an annular apparatus. Presumably, this discovery represents a significant economic breakthrough since the cost of building and maintaining turbines is strongly related to blade radii.

OBJECTS AND ADVANTAGES

Accordingly, the several objects and advantages of this invention begin with a superventuri power source comprising:

(a) a series of at least two venturi tubes whereof each of the venturi tubes includes a central axis through a substantially hollow conduit having a venturi constriction; and wherein the venturi constriction includes an inlet of nonzero length and generally decreasing normal cross-sectional area which leads to a throat of generally minimal normal cross-sectional area which, in turn, leads to an outlet of nonzero length and generally increasing normal cross-sectional area; and whereby each normal cross-sectional area is perpendicular to its respective central axis;

(b) a superventuri apparatus including: (i) at least one twosome in the series of at least two venturi tubes labeled an alpha- and a beta-venturi tube, respectively, and of predetermined successively increasing flow capacity, respectively; (ii) the substantially hollow conduit of the alpha-venturi tube having an open entrance and an open exit adjacent its inlet and outlet, respectively, to permit flow of a selected medium through the open entrance into the venturi constriction and out of the open exit; (iii) the respective inlets of the twosome each facing the intended direction of flow of the selected medium; (iv) the open exit of the alpha-venturi tube being placed adjacent the throat of the beta-venturi tube in a manner that between a front and a back of the apparatus the respective central axes of the twosome essentially merge into a central super-axis along an intended line of flow of the selected medium; and (v) as referenced from the super-axis, the inlets of the alpha- and beta-venturi tubes being positioned to intercept relatively inner and outer portions of the selected medium as an alpha- and a beta-flow, respectively, whereby the alpha-flow as exhaust from the open exit of the alpha-venturi tube joins the accelerated beta-flow adjacent the throat of the beta-venturi tube causing a pumping action by the beta-venturi tube on the alpha-venturi tube; and (c) a beta-turbine adjacent the throat of the beta-venturi tube to recover useful rotary mechanical power from flow power of the selected medium.

Another object is a beta-turbine which includes at least one impulse blade comprising a top and a bottom with the radial length between the top and the bottom being less than about three-fourths the minimal distance between the central super-axis and the closest limit of the throat of the beta-venturi tube.

Another object is a superventuri power source whereby the normal pumping cross-sectional area of the beta-venturi tube, which is defined as the difference between the maximal normal cross-sectional area of the inlet of the beta-venturi tube and the maximal normal cross-sectional area of the inlet of the alpha-venturi tube, is at least as great as the maximal normal cross-sectional area of the inlet of the alpha-venturi tube.

Too, an object is a superventuri power source whereby the contraction ratio of the alpha-venturi tube, defined as the ratio between the maximal normal cross-sectional area of the inlet and the minimal normal cross-sectional area of the throat of the alpha-venturi tube, is greater than the respective contraction ratio of the beta-venturi tube.

Still another object is a superventuri power source whereby the angle of the outlet of the alpha-venturi tube and the angle of the outlet of the beta-venturi tube are on average each less than about 30 degrees.

Moreover, another object is a superventuri power source whereby the angle of the outlet of the alpha-venturi tube is generally less than the angle of the outlet of the beta-venturi tube.

Too, another object is a superventuri power source which also includes an alpha-turbine adjacent the throat of the alpha-venturi tube to recover yet more useful rotary mechanical power from flow power of the selected medium.

Yet another object is a superventuri power source including a flow conveyor which generally encloses the superventuri power source at least from about the front to about the back of the superventuri apparatus and which serves to contain the flow of the selected medium through the superventuri power source.

A further object is a superventuri power source wherein the throat of the beta-venturi tube has a nonzero length and generally constant minimal normal cross-sectional area.

An additional object is a superventuri power source whereby the selected medium is composed substantially of air in a wind.

A supplementary object is a superventuri power source whereby the selected medium is composed substantially of steam.

A separate object is a superventuri power source whereby the selected medium is composed substantially of carbon dioxide gas and water vapor as products of combustion.

A different object is a superventuri power source whereby the selected medium is composed substantially of a stream of liquid water.

A distinct object is a superventuri power source wherein:

(a) the alpha- and beta-venturi tubes of the twosome are annular and positioned concentrically along the central super-axis which is linear;

(b) the minimal diameter for the throat of the beta-venturi tube is greater than the maximal diameter for the open exit of the alpha-venturi tube;

(c) the beta-turbine includes at least one abbreviated impulse blade comprising a top and a bottom with radial length between the top and the bottom approximating half the difference between the minimal diameter for the throat of the beta-venturi tube and the maximal diameter for the open exit of the alpha-venturi tube; and (d) the rotation radii for the top and the bottom of the abbreviated impulse blade normal to the central super-axis are approximately half the minimal diameter for the throat of the beta-venturi tube and half the maximal diameter for the open exit of the alpha-venturi tube, respectively.

Other objects and advantages of the current invention are to provide a superventuri power source which may have an enhanced power amplification factor, which may exhibit superior performance at low rates of flow of the selected medium, and which depending on the selected medium, may be relatively benign to environment.

Still more objects and advantages of the invention will become apparent from the drawings and ensuing description of it.

NUMERIC CODE

Figure 1A:
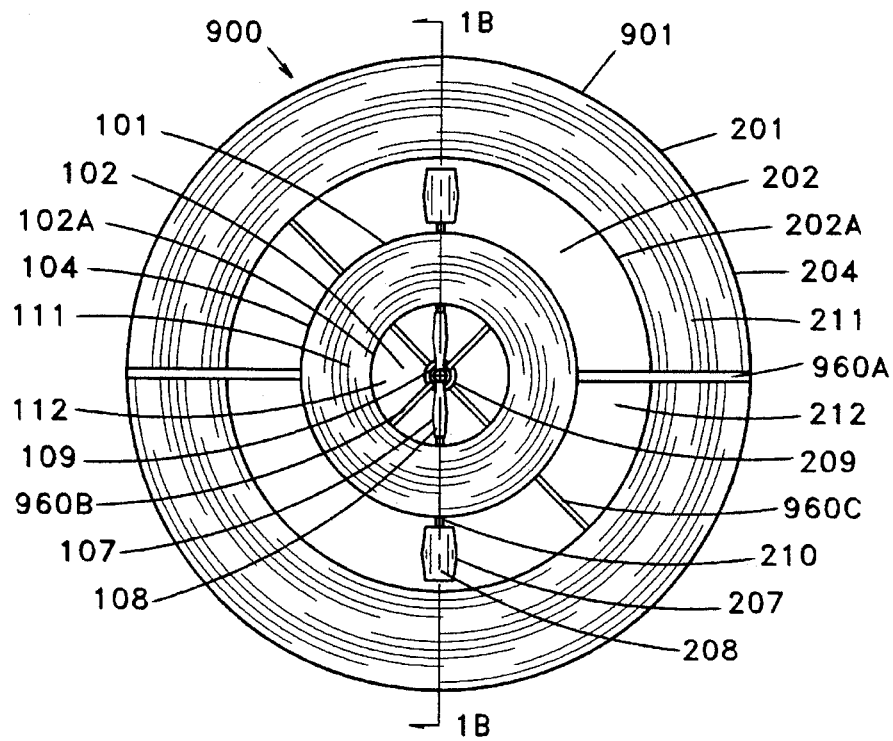
FIG. 1A is a front view of a superventuri power source of the present invention having two stages.

1–9: FIGURES
10–99: DIMENSIONS AND REFERENCE POINTS
100–999: COMPONENTS OF FIGURES

DIMENSIONAL CHARACTERISTICS 10 length of first-stage venturi tube 101
11 maximal diameter for inlet 111
12 minimal diameter for throat 112
13 maximal diameter for outlet 113
14 angle of inlet 111
15 length of throat 112
16 angle of outlet 113
18 radial length of standard impulse blade 108
19 maximal diameter of open exit 106
20 length of second-stage venturi tube 201
21 maximal diameter for inlet 211
22 minimal diameter for throat 212
23 maximal diameter for outlet 213
24 angle of inlet 211
25 length of throat 212
26 angle of outlet 213
28 radial length of abbreviated impulse blade 208
60 −5.08 centimeter (−2 inch) position on scale 600
62 zero position on scale 600
64 +5.08 centimeter (+2 inch) position on scale 600
66 +10.16 centimeter (+4") position on scale 600
88 radial length of standard impulse blade 288

COMPONENTS OF FIGURES 100 first-stage venturi power source
101 first-stage venturi tube
102 hollow conduit of first-stage venturi tube 101
102A venturi constriction in hollow conduit 102
103 central axis through hollow conduit 102
104 open entrance of hollow conduit 102
106 open exit of hollow conduit 102
107 first-stage turbine
108 standard impulse blade of first-stage turbine 107
109 first-stage generator
111 inlet of first-stage venturi constriction 102A
112 throat of first-stage venturi constriction 102A
113 outlet of first-stage venturi constriction 102A
200 second-stage venturi power source
201 second-stage venturi tube
202 hollow conduit of second-stage venturi tube 201
202A venturi constriction in hollow conduit 202
203 central axis through hollow conduit 202
204 open entrance of hollow conduit 202
206 open exit of hollow conduit 202
207 second-stage turbine
208 abbreviated impulse blade of second-stage turbine 207
208A top of abbreviated impulse blade 208
208B bottom of abbreviated impulse blade 208
209 second-stage generator
210 thin connector for second-stage turbine 207
211 inlet of second-stage venturi constriction 202A
212 throat of second-stage venturi constriction 202A
213 outlet of second-stage venturi constriction 202A
288 standard impulse blade of second-stage turbine 207
288A top of standard impulse blade 288
288B bottom of standard impulse blade 288
300 third-stage venturi power source
301 third-stage venturi tube
302 hollow conduit of third-stage venturi tube 301
302A venturi constriction in hollow conduit 302
303 central axis through hollow conduit 302
304 open entrance of hollow conduit 302
306 open exit of hollow conduit 302
307 third-stage turbine
308 abbreviated impulse blade of third-stage turbine 307
309 third-stage generator
310 thin connector for turbine 307
311 inlet of third-stage venturi constriction 302A
312 throat of third-stage venturi constriction 302A
313 outlet of third-stage venturi constriction 302A
600 scale for positioning open exit 106 of first-stage venturi tube 101 relative to throat 212 of second-stage venturi tube 201
700 intended direction of flow of a selected medium
702 intended line of flow of a selected medium
900 superventuri power source
901 superventuri apparatus
903 central super-axis of superventuri apparatus 901
909 central generator of superventuri power source 900
919 first-stage transmission
929 second-stage transmission
960A structural support for superventuri apparatus 901

960B structural support for generator 109
960C structural support for generator 209
962 duct generally enclosing superventuri power source 900
964 front of superventuri apparatus 901
966 back of superventuri apparatus 901

DETAILED DESCRIPTION OF A PREFERRED EMBODIMENT

Figure 1B:
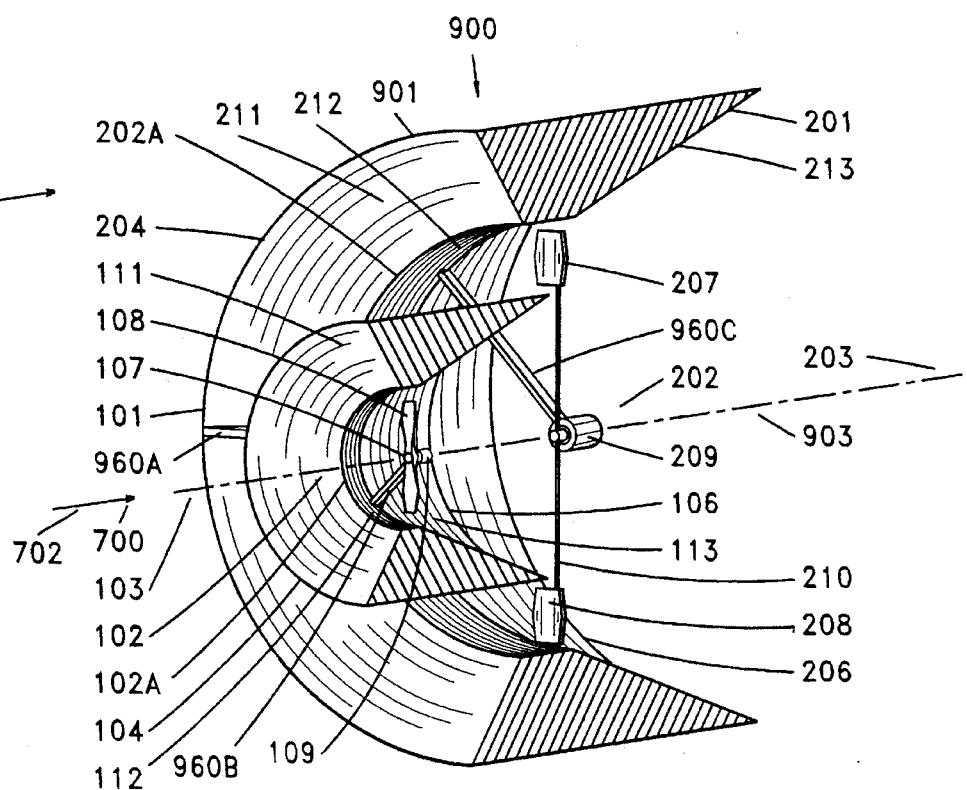
FIG. 1B is a cross-sectional perspective view of the superventuri power source of FIG. 1A as shown along the line 1B—1B.
Figure 1C:
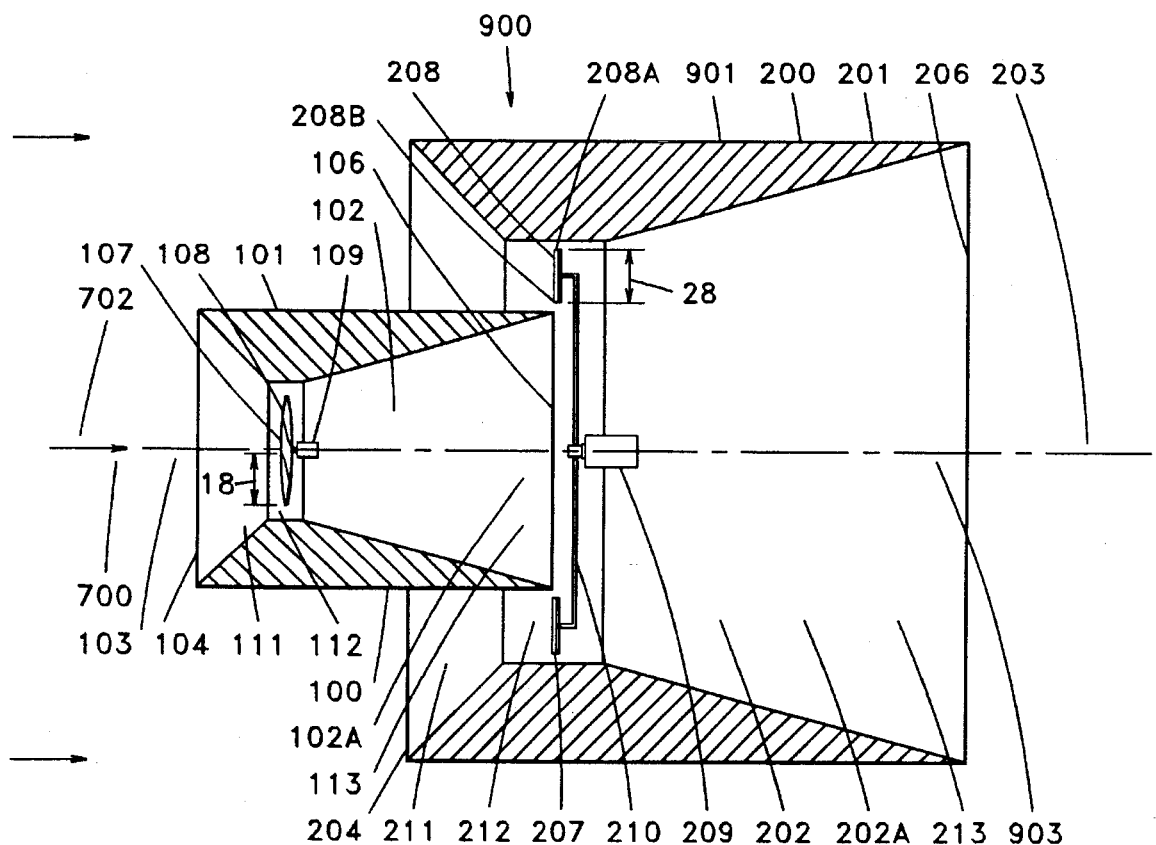
FIG. 1C is a cross-sectional side view of the superventuri power source of FIGS. 1A and 1B.

In FIG. 1A–1C number 900 refers to a superventuri power source of the current invention. In the front view of FIG. 1A superventuri power source 900 comprises a series of two venturi tubes, or a twosome of venturi tubes of successively increasing flow capacity, including a hollow conduit 102 of a first-stage venturi tube 101 fastened to a hollow conduit 202 of a second-stage venturi tube 201 via a pair of structural supports 960A to form a superventuri apparatus 901. Venturi tube 101, which may also be labeled an alpha-venturi tube, has a lesser flow capacity relative to the greater flow capacity of venturi tube 201, which may also be labeled a beta-venturi tube.

As indicated earlier, two approaches toward designating components are used. The first, or absolute approach, employs designations such as first-, second-, or third-stage component, etc. The second, or relative approach, employs designations such as alpha-, beta-, or gamma-component, etc. The difference is that a first-, second-, or third-stage component is always just that. However, a third-stage component may be either a gamma-component to a second-stage component which is relatively designated a beta-component, or a third-stage component may be a beta-component to a second-stage component which is relatively designated an alpha-component.

Superventuri power source 900 has a first-stage turbine 107 adjacent a throat 112 in a venturi constriction 102A of hollow conduit 102 of first-stage venturi tube 101. Since, first-stage venturi tube 101 may be labeled an alpha-venturi tube, then first-stage turbine 107 may be correspondingly labeled an alpha-turbine to recover useful rotary mechanical power from the flow power of a selected medium. First-stage turbine 107 has a pair of standard impulse blades 108 attached to a first-stage generator 109.

Superventuri power source 900 also has a second-stage turbine 207 adjacent a throat 212 in a venturi constriction 202A of hollow conduit 202 of second-stage venturi tube 201. Since second-stage venturi tube 201 may be labeled a beta-venturi tube, the second-stage turbine 207 may be correspondingly labeled a beta-turbine to recover useful rotary mechanical power from the flow power of a selected medium. It is noteworthy in FIG. 1A that second-stage turbine 207 has a pair of abbreviated impulse blades 208 attached to a second-stage generator 209 via a pair of thin connectors 210.

In FIG. 1A it is also seen that first-stage generator 109 is attached to throat 112 via a pair of structural supports 960B. Similarly, second-stage generator 209 is attached to throat 212 via a pair of structural supports 960C.

Reference to FIG. 1B which is a cross-sectional perspective view of superventuri power source 900 of FIG. 1A along the line 1B—1B, will be helpful in understanding details of the structure for venturi tubes 101 and 201 of superventuri apparatus 901. However, a comparison of FIG. 1B with FIG. 1A reveals that for illustrative purposes turbines 107 and 207, generators 109 and 209, and thin connectors 210 remain fully intact instead of being cut in half in FIG. 1B.

Prominent in FIG. 1B are a central axis 103 through hollow conduit 102 having venturi constriction 102A in venturi tube 101 and a central axis 203 through hollow conduit 202 having venturi constriction 202A in venturi tube 201. It is seen that an open exit 106 of first-stage venturi tube 101, or the alpha-venturi tube, is placed adjacent throat 212 of second-stage venturi tube 201 in a manner that the respective central axes 103 and 203 of the twosome of venturi tubes 101 and 201 essentially merge into a central super-axis 903 along an intended line of flow 702 of the selected medium.

Venturi constriction 102A of tube 101 includes an inlet 111 of nonzero length and generally decreasing normal cross-sectional area which leads to throat 112 of generally minimal normal cross-sectional area which in turn, leads to an outlet 113 of nonzero length generally increasing normal cross-sectional area. Venturi constriction 202A of tube 201 includes an inlet 211 of nonzero length and generally decreasing normal cross-sectional area which leads to throat 212 of generally minimal normal cross-sectional area which, in turn, leads to an outlet 213 of nonzero length and generally increasing normal cross-sectional area. Here, each normal cross-sectional area is perpendicular to its respective central axis, either 103 or 203.

It is also apparent in FIG. 1B and even more apparent in FIG. 1C, FIG. 2, FIG. 3, FIG. 5, and FIG. 6 that throats 112, 212, and 312 of venturi tubes 101, 201, and 301, respectively, each has a nonzero length and generally constant minimal normal cross-sectional area. This is in contrast with Jourdain in France 26,233 and Bloch in France 891,697 where the drawings exhibit throats of zero length and generally minimal normal cross-sectional area.

Reference to FIG. 1C which is a cross-sectional side view of superventuri power source 900 of FIGS. 1A and 1B will assist in understanding that hollow conduit 102 of first-stage venturi tube 101, or the alpha-venturi tube, has an open entrance 104 and open exit 106 adjacent its inlet 111 and outlet 113, respectively, to permit flow 702 of the selected medium through open entrance 104 into venturi constriction 102A and out of open exit 106. Too, respective inlets 111 and 211 of the twosome of venturi tubes 101 and 201 each face an intended direction of flow 700 of the selected medium. Finally, as referenced from super-axis 903, inlets 111 and 211 of first- and second-stage venturi tubes 101 and 201, or the alpha- and beta-venturi tubes, are positioned to intercept relatively inner and outer portions of the selected medium as an alpha- and a beta-flow respectively, whereby the alpha-flow as exhaust from open exit 106 of first-stage venturi tube 101, or the alpha-venturi tube, can join accelerated beta-flow adjacent throat 212 of second-stage venturi tube 201, or the beta-venturi tube, causing a pumping action by the beta-venturi tube on the alpha-venturi tube.

FIG. 1C also illustrates a distinction between standard impulse blade 108 of first-stage turbine 107 and abbreviated impulse blade 208 of second-stage turbine 207. A radial length 18 of standard impulse blade 108 approximates the span between a top at the tip of standard impulse blade 108 and a bottom adjacent central super-axis 903. Radial length 18 of standard impulse blade 108 is slightly less than the span between the tip and central super-axis 903 because of the contribution from a central hub which is shown more clearly in FIGS. 1A–1B. Thus in general in this discussion, a radial length for a blade is taken to imply the active length over which the blade promotes rotation about an axis. This length will usually be characterized by the distance over which the blade has a pitch angle. Too, the term, radial length, as illustrated in the figures, implies a length normal to the axis of rotation which is here central super-axis 903 in every case.

Conversely, in FIG. 1C a radial length 28 between a top 208A and a bottom 208B of abbreviated impulse blade 208 approximates the difference between the minimal radius of throat 212 and the maximal radius of open exit 106. Here, radial length 28 is slightly less than the specified difference, but under other geometric arrangements of superventuri apparatus 901 it might as well be slightly greater than the specified difference.

Figure 5:
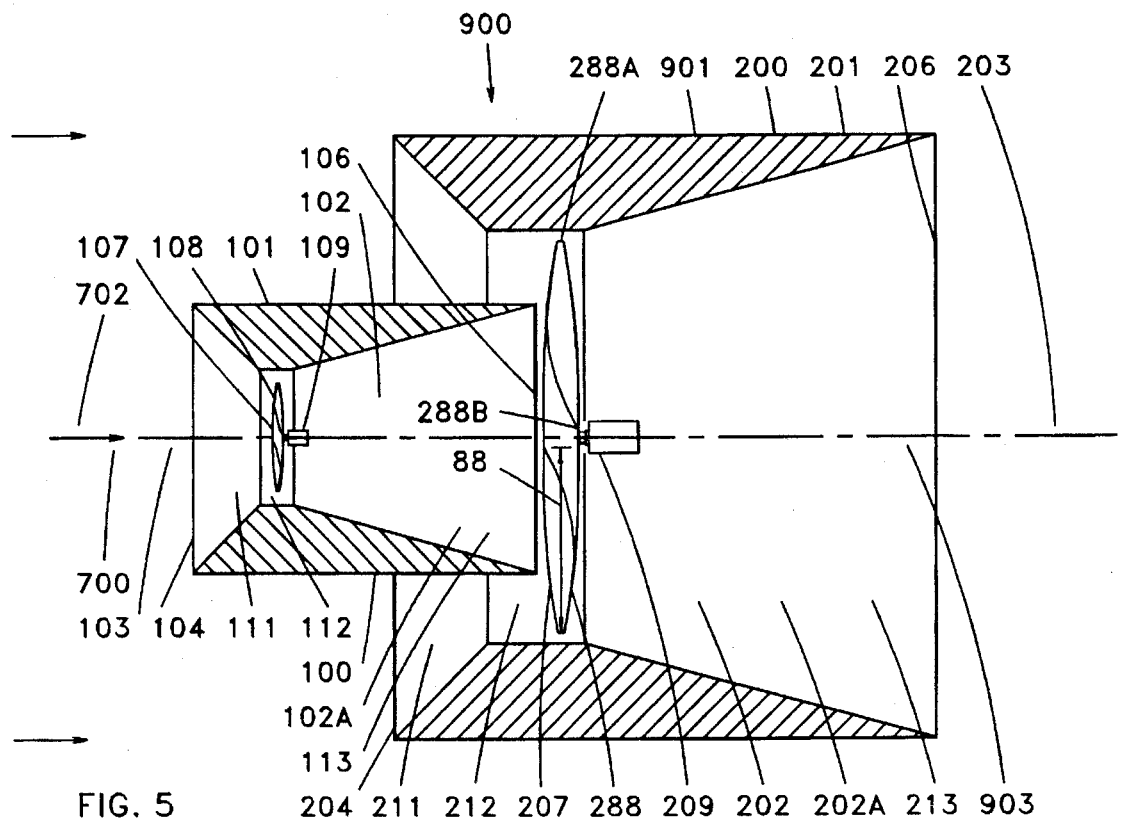
FIG. 5 is a cross-sectional side view of still another superventuri power source of the present invention similar to that in FIGS. 1A–1C except the second-stage turbine has standard rather than abbreviated impulse blades.

In turn, abbreviated impulse blades 208 of second-stage turbine 207 in FIG. 1C may be contrasted with a pair of less preferred standard impulse blades 288 of second-stage turbine 207 in FIG. 5. Superventuri power source 900 in FIG. 5, which is another manifestation of the current invention, is similar to that in FIG. 1C except for this distinction between blades 288 and 208 of respective second-stage turbines 207. As suggested earlier, the difference in preference relates to a significant enhancement of performance for abbreviated impulse blades 208 in FIG. 1C relative to standard impulse blades 288 in FIG. 5. This enhancement will be discussed in the following section.

Figure 3:
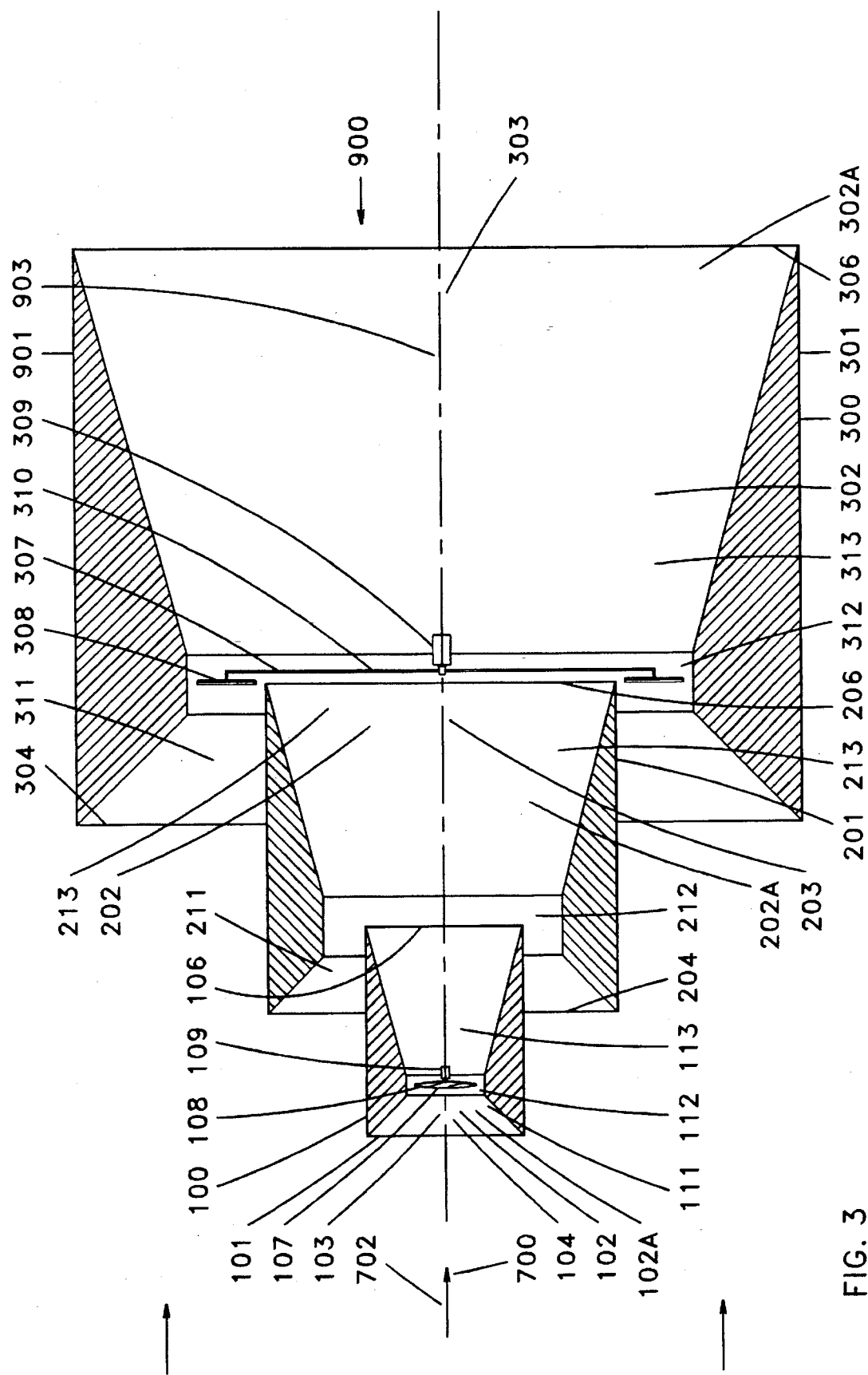
FIG. 3 is a cross-sectional side view of yet another superventuri power source of the present invention having three stages with the third-stage venturi tube equipped with a turbine and generator pumping on a second-stage venturi tube which does not have a power conversion means.

However, abbreviated impulse blades 208 illustrated adjacent the respective throats 212 of venturi tubes 201 in FIGS. 1A–1C and FIG. 6 as well as abbreviated impulse blades 308 adjacent the throat of venturi tube 301 in FIG. 3 can also be described in more general terms. Each of these beta-turbines is seen to meet the preferred condition of including at least one impulse blade comprising a top and a bottom with the radial length between the top and bottom being less than about three-fourths the minimal distance between the respective central super-axis 903 and the closest limit of the throat of the respective beta-venturi tube.

Second-stage turbine 207 with standard impulse blades 288 in FIG. 5 can also be described as including at least one impulse blade 288 comprising a top 288A at the tip and a bottom 288B with the radial length 88 between the top 288A and bottom 288B being greater than about three-fourths the distance between central super-axis 903 and the closest limit of the throat 212 the beta-venturi tube, or second-stage venturi tube 201. Once again, radial length 88 is taken to be the active length normal to the axis of rotation, here super-axis 903. Thus, second-stage turbine 207 in FIG. 5 fails to meet the preferred condition, not because of any distinction in design, but because it is simply too long.

Figure 2:
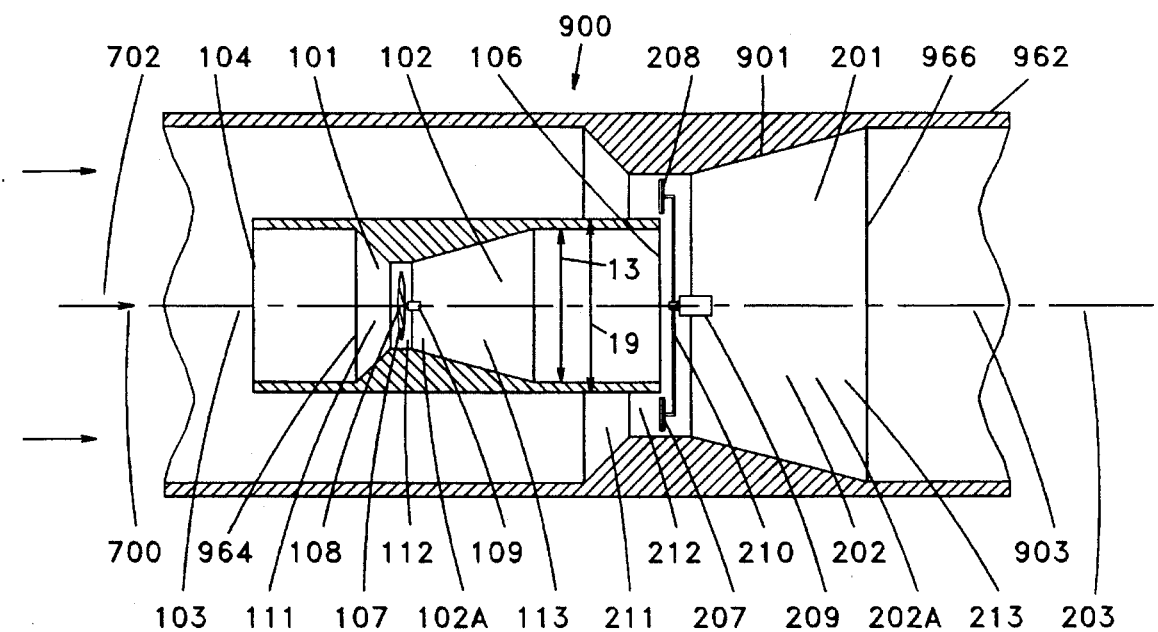
FIG. 2 is a cross-sectional side view of another superventuri power source of the present invention similar to that in FIGS. 1A–1C except that it is generally enclosed within a flow conveyor and the hollow conduit of the initial stage extends beyond the venturi constriction on both ends.

FIG. 2 illustrates a cross-sectional side view of superventuri power source 900 which is still another manifestation of the current invention. Superventuri power source 900 in FIG. 2 is similar to source 900 in FIGS. 1A–1C except it is generally enclosed within a duct 962 at least from about a front 964 to about a back 966 of superventuri apparatus 901. The purpose of duct 962 is to contain the flow of a selected medium through superventuri power source 900. In FIG. 2 the position at which inlet 111 attains its maximal normal cross-sectional area is seen to define front 964 while the position at which outlet 213 attains its maximal normal cross-sectional area is seen to define back 966. In general, then, the front of a superventuri apparatus is the position at which the normal cross-sectional area of the inlet of the leading venturi tube attains its maximal value, while the back is the position at which the normal cross-sectional area of the outlet of the trailing venturi tube attains its maximal value.

Too in FIG. 2, hollow conduit 102 of first-stage venturi tube 101 now extends beyond venturi constriction 102A on both ends. These short extensions which still have open entrance 104 and open exit 106 adjacent inlet 111 and outlet 113, respectively, may be thought of as assisting in columniation of flow.

However, the drawing in FIG. 2 does make it clear that hollow conduit 102 of the first-stage venturi tube 101, or the alpha-venturi tube, must have open entrance 104 and open exit 106 adjacent inlet 111 and outlet 113, respectively, to permit flow 702 of a selected medium through open entrance 104 and out of open exit 106. Conversely, in FIG. 2, second-stage venturi tube 201, or the beta-venturi tube, does not have an open entrance and an open exit because duct 962 extends forward from front 964 and rearward from back 966. Therefore, since FIGS. 1A–1C do show second-stage venturi tube 201 with an open entrance 204 and an open exit 206 adjacent inlet 211 and outlet 213, respectively, we may conclude that the beta-venturi tube may or may not have open entrance 204 and exit 206.

FIG. 2 also demonstrates that there may be a distinction between a maximal diameter 13 for outlet 113 and a maximal diameter 19 for open exit 106 in venturi tube 101 of superventuri power source 900. Here, the former refers to an internal dimension of venturi constriction 102A of hollow conduit 102, while the latter refers to an external dimension of hollow conduit 102. On the other hand, it is seen in FIGS. 1A–1C that maximal diameter 13 for outlet 113 and maximal diameter 19 for open exit 106 of venturi tube 101 are indistinguishable due to the details of construction thereto.

FIG. 3 is a cross-sectional side view of yet another manifestation of superventuri power source 900 of the present invention which includes three stages with a third-stage venturi tube 301 having a turbine 307 with a pair of abbreviated impulse blades 308 attached to generator 309 with a pair of thin connectors 310. Third-stage venturi tube 301 pumps on second-stage venturi tube 201 which, however, is not equipped with a turbine and generator. Second-stage venturi tube 201 of superventuri power source 900 in FIG. 3 can be viewed as being a pumping stage.

Beyond this, components in the numeric series 301–313 for third-stage venturi tube 301 in FIG. 3 correspond in form and function to components with the same last two digits in the numeric series 201–213 for second-stage venturi tube 201 in FIGS. 1A–1C. In FIG. 3 first-stage venturi tube 101 may be designated an alpha-venturi tube relative to second-stage venturi tube 201 which is then a beta-venturi tube. In turn, second-stage venturi tube 201 may be designated an alpha-venturi tube relative to third-stage venturi tube 301 which is then a beta-venturi tube. Corresponding designations for other components such as generators and turbines may also follow this lead.

The fact that in FIG. 3 third-stage venturi tube 301 as a beta-venturi tube is equipped with third-stage turbine 307 as a beta-turbine and second-stage venturi tube 201 as an alpha-venturi tube is not equipped with a second-stage turbine as an alpha-turbine should be contrasted with other manifestations of the current invention in FIGS. 1A–1C, FIG. 2, FIG. 5, and FIG. 6. In all of these latter manifestations, which have only two stages, both the alpha- and beta-venturi tubes are seen to have turbines. Hence in the appended claims, the independent claims, as tendered, are deliberately silent regarding the existence of an alpha-turbine.

With regard to nomenclature, FIG. 1C, FIG. 3, FIG. 4B, FIG. 4D, FIG. 5, and FIG. 6 contain, as appropriate, components labeled a first-stage venturi power source 100, a second-stage venturi power source 200, and a third-stage venturi power source 300. The phrase, venturi power source, is intended to include a venturi tube together with its respective turbine. Hence, venturi power source 100 is comprised of first-stage venturi tube 101 and first-stage turbine 107. In this alternative description, superventuri power source 900 in FIG. 1C, for example, may be considered as including venturi power sources 100 and 200. For practical purposes, this description is equivalent to that employed heretofore.

Figure 4A:
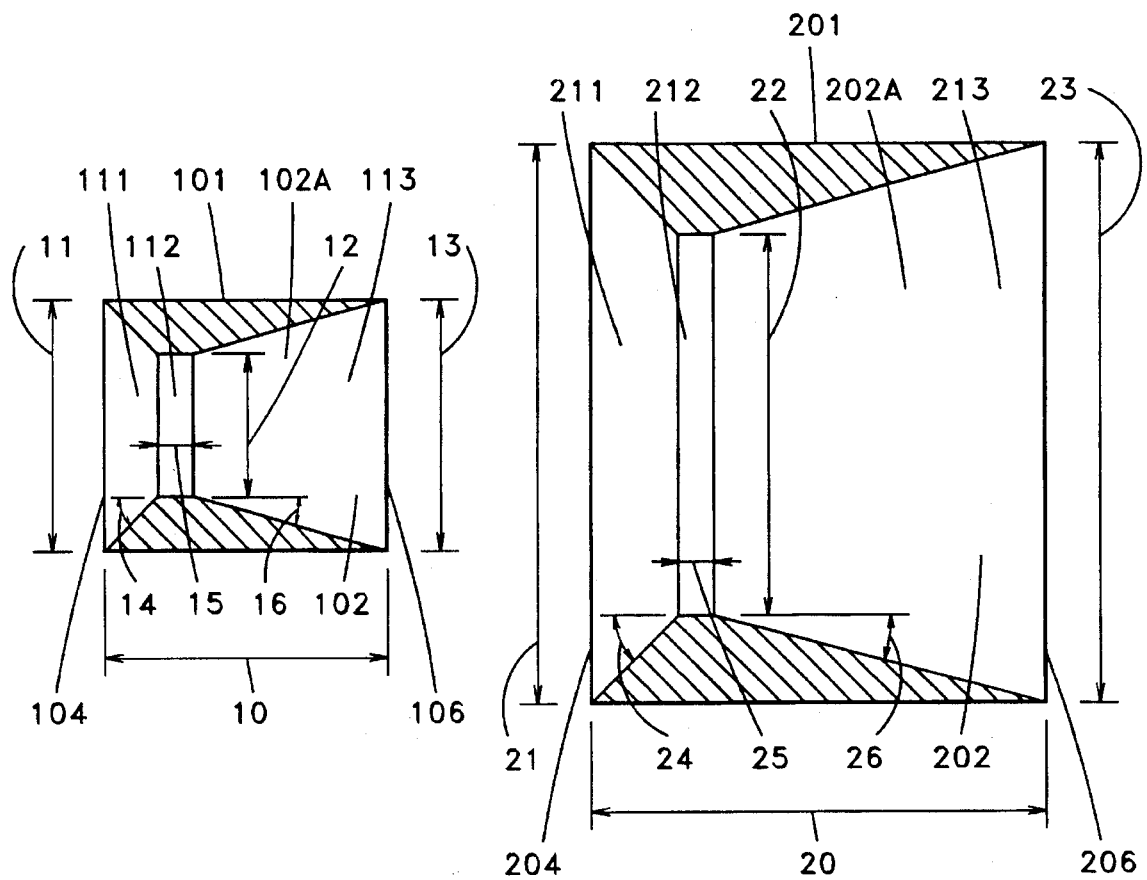
FIG. 4A is a cross-sectional side view illustrating some dimensional characteristics of a superventuri apparatus wherein the first-stage venturi tube to the left is separated from the second-stage venturi tube to the right.

Now, before turning attention to some of the more preferred characteristics of the embodiment in FIGS. 1A–1C, it will be helpful to also refer to the cross-sectional side view of FIG. 4A. In FIG. 4A some dimensional characteristics are shown with first-stage venturi tube 101 to the left separated from second-stage venturi tube 201 to the right in the diagram. First-stage venturi tube 101 has a maximal diameter 11 for inlet 111, minimal diameter 12 for throat 112, and a maximal diameter 13 for outlet 113. In turn, second-stage venturi tube 201 has a maximal diameter 21 for inlet 211, a minimal diameter 22 for throat 212, and a maximal diameter 23 for outlet 213. It will be apparent that the associated maximal or minimal normal cross-sectional area associated with each diameter is proportional to the square of that diameter halved.

Also illustrated to the left in FIG. 4A are an angle 14 of inlet 111, a length 15 of throat 112, an angle 16 of outlet 113, and a length 10 of first-stage venturi tube 101. Illustrated to the right in this figure are an angle 24 of inlet 211, a length 25 of throat 212, an angle 26 of outlet 213, and a length 20 of second-stage venturi tube 201.

Accordingly, FIGS. 1A–1C, for example, illustrate a superventuri power source 900 with the preferred condition whereby the normal pumping cross-sectional area of second-stage venturi tube 201, or the beta-venturi tube, which is defined as the difference between the maximal normal cross-sectional area of inlet 211 of the beta-venturi tube and maximal normal cross-sectional area of inlet 111 of first-stage venturi tube 101, or the alpha-venturi tube, is at least as great as the maximal normal cross-sectional area of inlet 111 of the alpha-venturi tube. Of course, the purpose of this condition is to permit a sufficient amount of selected medium to flow into the throat of the beta-venturi tube to cause reasonably effective pumping by the beta-venturi tube on the exhaust from the alpha-venturi tube.

Too, FIGS. 1A–1C also demonstrate a superventuri power source 900 with the preferred condition whereby the contraction ratio of first-stage venturi tube 101, or the alpha-venturi tube, defined as the ratio between the maximal normal cross-sectional area of inlet 111 and the minimal normal cross-sectional area of throat 112 of the alpha-venturi tube, is greater than the respective contraction ratio of second-stage venturi tube 201, or the beta-venturi tube. More specifically, as stated in a previous section, the contraction ratio of first-stage venturi tube 101 is 4.0 and the contraction ratio of second-stage venturi tube 201 is 2.14 in FIGS. 1A–1C.

Furthermore, as will be demonstrated with experimental data in the following section, the efficiency factor of any venturi tube when taken alone tends to increase as contraction ratio decreases. Hence, it is logical to have superventuri power source 900 in FIGS. 1A–1C where first-stage venturi tube 101 has a relatively high contraction because its efficiency is increased by the pumping action of second-stage venturi tube 201. Conversely, it is also logical to have superventuri power source 900 where second-stage venturi tube 201 has a relatively low contraction ratio, and therefore relatively higher efficiency factor when taken alone, because its efficiency is not increased by any pumping action. However, even if second-stage venturi-tube 201 were pumped on by third stage tube 301 such as illustrated in FIG. 3, the basic logic would still hold true since the efficiency of first-stage tube 101 is now twice increased while that of second-stage venturi tube 201 is now only once increased by pumping. Accordingly, this preferred condition on contraction ratios tends to enhance the overall efficiency of superventuri power source 900.

Still another preferred condition demonstrated in FIGS. 1A–1C relates to angles of outlets 113 and 213 of venturi tubes 101 and 201, respectively. These angles are illustrated as angle 16 of outlet 113 and angle 26 of outlet 213 in FIG. 4A. Accordingly, FIGS. 1A–1C demonstrate a superventuri power source 900 whereby angle 16 of outlet 113 of first-stage venturi tube 101, or the alpha-venturi tube, and angle 26 of outlet 213 of second-stage venturi tube 201, or the beta-venturi tube, are on average each less than about 30 degrees. More specifically, for the superventuri power source 900 represented in FIGS. 1A–1C angles 16 and 26 for outlets 113 and 213 are each approximately 15 degrees. Data presented in the next section will demonstrate that the efficiency factors tend to increase with decreasing angle 16 for outlet 113 so that this preferred condition tends to promote higher efficiency for superventuri power source 900.

Moreover, another preferred condition has superventuri power source 900 whereby angle 16 for outlet 113 of first-stage venturi tube 101, or the alpha-venturi tube, is generally less than angle 26 of outlet 213 of second-stage venturi tube 201, or the beta-venturi tube. While this condition is not explicitly demonstrated in FIGS. 1A–1C, some of the data presented in FIGS. 1D and 1F does pertain to a configuration similar to that in FIGS. 1A–1C except that first-stage venturi tube 101, or the alpha-venturi tube, had angle 16 for outlet 113 of 7.5 degrees while second-stage venturi tube 201 had angle 26 for outlet 213 of 15 degrees. The argument for this condition pertains to the promotion of compactness in superventuri power source 900 at the least loss in efficiency. This may be seen with reference to FIG. 4A where length 10 for first-stage venturi tube 101 and length 20 for second-stage venturi tube 201 are in part inversely related to the magnitudes of angles 16 and 26 of outlets 113 and 213, respectively. Since, the beta-venturi tube may tend to have a relatively high efficiency due to its reduced contraction ratio relative to an alpha-venturi tube, and since it may also have a relatively longer length because of its relatively larger diameter, it may, under some circumstances, make sense in the development of compactness in superventuri power source 900 to consider trading off an increment of efficiency in the form of a relatively higher outlet angle for the beta-venturi tube.

A distinct preferred characteristic of superventuri power source 900 in FIGS. 1A–1C and FIG. 2 with reference also to FIG. 4A has first-stage venturi tube 101 and second-stage venturi tube 201, or the alpha- and beta-venturi tubes of the twosome, being annular and positioned concentrically along central super-axis 903 which is linear. Too, in these figures inspection reveals that minimal diameter 22 for throat 212 of second-stage venturi tube 201, or the beta-venturi tube, is greater than maximal diameter 19 for open exit 106 of first-stage venturi tube 101, or the alpha-venturi tube. Second-stage turbine 207, or the beta-turbine, includes at least one abbreviated impulse blade 208 comprising top 208A and bottom 208B with radial length 28 between top 208A and bottom 208B approximating half the difference between minimal diameter 22 for throat 212 of second-stage venturi tube 201, or the beta-venturi tube, and maximal diameter 19 for open exit 106 of first-stage venturi tube 101, or the alpha-venturi tube. Finally, the rotation radii for top 208A and bottom 208B of abbreviated impulse blade 208 normal to central super-axis 903 are approximately half minimal diameter 22 for throat 212 of the second-stage venturi tube 201, or the beta-venturi tube, and half maximal diameter 19 the open exit 106 of the first-stage venturi tube 101, or the alpha-venturi tube, respectively. It is seen that this preferred condition has to do with the creation of an annular opening between venturi tubes 101 and 201 in which second-stage turbine 207, or the beta turbine, may rotate and draw power efficiently.

OPERATION OF THE INVENTION

An explanation of the operation of the current invention begins with the development of a basic theory for a superventuri apparatus. Next, the setup and procedures developed to test the theory are described. Finally, experimental results are presented which tend to support the theory. As well, these results suggest the notion that a superventuri power source offers potential as a safe, clean, and inexpensive pathway to some societal requirements for energy.

THEORETICAL SUB-SECTION. As follow-up to the qualitative discussion in previous sections describing the behavior of throat velocities and pressures in the various stages of a superventuri apparatus undergoing flow by a selected medium, a semi-quantitative approach is now presented to further assist in understanding the technology. The development proceeds from consideration of separated venturi tubes 101 and 201 in FIG. 4A to fully merged two-stage superventuri apparatuses 901 such as found in FIGS. 1A–1C, FIG. 2, FIG. 4D, and FIGS. 5–6. The outcomes of this development are predicted orders of throat velocities and pressures in a two-stage superventuri apparatus. There is also a predicted multiplicative effect on the throat velocity of a lower stage from pumping by an upper stage. The latter multiplicative effect is of keen interest because it strongly suggests the superventuri apparatus to be a potentially powerful flow accelerator. Of course, the development also makes obvious similar relationships for superventuri apparatuses 901 having more than two stages such as illustrated in FIG. 3.

With the exception of the velocity u and pressure p of the selected medium, subscripts for velocities, pressures, and cross-sectional areas in what follows are keyed to their respective diameters in FIG. 4A. For example, in FIG. 4A the diameter of throat 212 of venturi tube 201 is length 22 which leads to velocity $u_{22}$, pressure $p_{22}$, and normal cross-sectional area $A_{22}$ at throat 212. This method of keying subscripts is in contrast with that in EQN. 2 where subscripts i's and t's were used to denote relationships at the inlet and throat, respectively.

Accordingly, EQNS. 3&4 are relationships, respectively, for velocity $u_{22}$ in meters per second and pressure $P_{22}$ in pascals at throat 212 of separated venturi tube 201 illustrated to the right in FIG. 4A. Other terms for EQN. 3 include: the velocity of the $$u_{22} = k_2 \left( \frac{A_{21}}{A_{22}} \right) u \quad \text{(EQN. 3)}$$

$$P_{22} = P - \frac{1}{2} \rho (u_{22}^2 - u^2) \quad \text{(EQN. 4)}$$

selected medium, u, adjacent entrance 204 at inlet 211 in meters per second; the maximal normal cross-sectional area, $A_{21}$, of inlet 211 in square meters; the minimal normal cross-sectional area, $A_{22}$, of throat 212 in square meters; and an efficiency factor, $k_2$, for venturi tube 201 in dimensionless units. Hence, EQN. 3 is a practical representation of the continuity equation corrected for effects such as the geometry of the device as well as the velocity, turbulence, viscosity, and drag of the selected medium. In EQN. 3, since usually $k_2(A_{21}/A_{22})>1$, then usually $u_{22}>u$.

Other terms for EQN. 4 include: the pressure of the selected medium, P, adjacent entrance 204 at inlet 211 in pascals and its density, $\rho$, assumed constant in kilograms per cubic meter. Of course, EQN. 4 is a basic representation of the Bernoulli equation with uncorrected terms for kinetic and internal energy. In EQN. 4, since usually $u_{22}>u$, then usually $P_{22}<P$.

Similarly, EQNS. 5&6 are relationships, respectively, for velocity, $u_{12}$, in meters per second and pressure, $P_{12}$, in pascals at throat 112 of separated venturi tube 101 illustrated to the left in FIG. 4A. Other terms for EQN. 5 include: the velocity $$u_{12} = k_1 \left( \frac{A_{13}}{A_{12}} \right) u_{13} \quad \text{(EQN. 5)}$$

$$P_{12} = P_{13} - \frac{1}{2} \rho (u_{12}^2 - u_{13}^2) \quad \text{(EQN. 6)}$$

of the selected medium, $u_{13}$, adjacent exit 106 at outlet 113 in meters per second; the maximal normal cross-sectional area, $A_{13}$, of outlet 113 in square meters; the minimal normal cross-sectional area, $A_{12}$, of throat 112 in square meters; and an efficiency factor, $k_1$, for venturi tube 101 in dimensionless units. EQN. 5 is similar to EQN. 3 except that its development proceeded by considering the throat-outlet pair rather than the inlet-throat pair. In this situation where the respective maximal normal cross-sectional areas, $A_{11}$ and $A_{13}$, of inlet 111 and outlet 113 are equal, the contraction ratio $A_{11}/A_{12}$ also equals the ratio $A_{13}/A_{12}$ so that EQN. 5 is analogous to EQN. 3. In EQN. 5, since usually $k_1(A_{13}/A_{12})>1$, then usually $u_{12}>u_{13}$.

The other term for EQN. 6 is the pressure of the selected medium, $P_{13}$, adjacent exit 106 at outlet 113 in pascals. In EQN. 6, since usually $u_{12}>u_{13}$, then usually $P_{12}<P_{13}$.

The development proceeds by merging the separated first- and second-stage venturi tubes 101 and 201 to the left and right, respectively, in FIG. 4A into superventuri apparatus 901 as illustrated in FIGS. 1A–1C, FIG. 2, FIG. 4D, and FIGS. 5–6. Under these circumstances the velocity $u_{13}$ of the selected medium as exhaust at exit 106 adjacent outlet 113 of first-stage venturi tube 101 approximately equals the velocity $u_{22}$ of the accelerated selected medium adjacent the throat 212 of second-stage venturi tube 201.

Replacement of $u_{13}$ for $u_{22}$ in EQN. 3 followed by substitution for $u_{13}$ in EQN. 5 gives EQN. 7. Since usually both $k_1(A_{13}/A_{12})>1$ $$u_{12} = k_1 \left( \frac{A_{13}}{A_{12}} \right) k_2 \left( \frac{A_{21}}{A_{22}} \right) u \quad \text{(EQN. 7)}$$

and $k_2(A_{21}/A_{22})>1$, EQN. 7 is of interest because it demonstrates a predicted multiplicative effect of pumping by an upper stage on the velocity at the throat of a lower stage. Of course, EQN. 7 may be readily expanded to accompany additional upper stages whereby each additional upper stage contributes a multiplicative term to the velocity at the throat of each lower stage. Now, since $u_{22}>u$, $u_{12}>u_{13}$, and $u_{13}=u_{22}$, we also have the predicted order of velocities, $u_{12}>u_{22}>u$. Furthermore, since $P_{22}<P$, $P_{12}<P_{13}$, and $P_{13}=P_{22}$, we also have the predicted order of pressures, $P_{12}<P_{22}<P$.

EXPERIMENTAL SUB-SECTION. As indicated in the introductory section, experiments were conducted in a wind tunnel which was 0.6 meter in diameter and 2.4 meters in length. A Patton Model EP24 industrial fan which was also 0.6 meter in diameter and which had a flow rating of either 1.9 or 2.6 cubic meters per second, depending upon switch setting, was positioned at an end opposite the test section in the second half of the tunnel. A Squared Model 77104 Voltage Regulator having an output of 117 Volts plus or minus 8.2 Volts was positioned between the fan and the line.

The fan pushed air through an egg crate straightening and focussing element at the beginning of the tunnel. The focussing portion of the element turned faster moving air from the higher radius area of fan inward toward the central axis of the tunnel. Hence, it was possible to realize a suitable velocity profile in the test section whereby air along the central axis was moving only slightly faster than that toward the walls of the tunnel.

Primary measurements of air velocity were made with a Dwyer Instruments series 166 Pitot tube 12 inches in length coupled to a Series 102-AV air velocity manometer which read either 0–2 inches of water pressure or 400–5,500 feet per minute in air velocity.

Secondary measurements of air velocity and of converted power were made with first-stage turbine 107 having standard impulse blades 108 with radial lengths 18 of 4.0 centimeters and with a pitch angle of 3.5 degrees. Turbine 107 served as the first-stage power conversion means in FIGS. 1A–1C, FIG. 2, FIG. 4B, FIG. 4D and FIG. 5. Turbine 107 was fitted to a Micro Mo Electronics series 1516T006ST DC micromotor as first-stage generator 109 which, in turn, was fitted to venturi tube 101 via structural supports 960B. First-stage generator 109 had an output of 0–6 Volts DC, a velocity constant of 3018 RPM/Volt, and a maximum power of 0.27 Watt. Since the combination of turbine 107 and generator 109 was detachable from first-stage venturi tube 101 via structural supports 960B, the combination also served as a secondary anemometer for calibration purposes.

Secondary measurements of air velocity and converted power were also made with second-stage turbine 207 having abbreviated impulse blades 208 with radial length 28 of 3.9 centimeters. These were cut from the central portions of the blades of a propeller having a 30.5 centimeter diameter and a pitch angle of seven degrees. Turbine 207 served as the second-stage power conversion means in FIGS. 1A–1C. Turbine 207 was fitted via thin connectors 210 with lengths of 12.8 centimeters to a Micro Mo Electronics series 2338S006S DC micromotor as second-stage generator 209 which in turn was fitted to venturi tube 201 via structural supports 960C. Second-stage generator 209 had an output of 0–6 Volts DC, a velocity constant of 1243 RPM/Volt, and a maximum power of 3.6 Watts. Since the combination of turbine 207 and generator 209 was detachable from second-stage venturi tube 201 via structural supports 960C, this combination also served as a secondary anemometer for calibration purposes.

Some preliminary measurements of air velocity and of converted power were made with second-stage turbine 207 having standard impulse blades 288 with radial lengths 88 of 13.7 centimeters and with a pitch angle of seven degrees. This turbine 207 served as the second-stage power conversion means in FIG. 5. It, turbine 207, was fitted directly to a Micro Mo Electronics series 2338S006S DC micromotor as second-stage generator 209 which in turn was fitted to venturi tube 201 via structural supports. Again, second-stage generator 209 had an output of 0–6 Volts DC, a velocity constant of 1243 RPM/Volt, and a maximum power of 3.6 Watts. Since the combination of turbine 207 and generator 209 was detachable from second-stage venturi tube 201 via the structural supports, this combination also served as a secondary anemometer for calibration purposes.

Voltage and current measurements on the outputs of generators 109 and 209 were made with a Fluke Model 25 digital multimeter. A typical experiment involved calibration of the combination of turbine 107 and generator 109 and the combination of turbine 207 and generator 209 as anemometers against the Pitot tube. This procedure was followed with three consecutive data runs on the selected experimental points. Each data run, in turn, involved the collection of ten consecutive data points spaced at 15 second intervals for each experimental point. Statistics in the form of averages and standard deviations on the 30 data points were then performed for each experimental point.

RESULTS SUB-SECTION. The first set of experiments on the performance of a venturi power source in relation to its contraction ratio serves to address the issue of the motivation behind development of superventuri power sources. The experiments were performed with several first-stage venturi power sources similar to number 100 in FIG. 4B. They comprised first-stage venturi tubes 101 together with turbine 107 and generator 109. As illustrated to the left in FIG. 4A, angles 14 of inlets 111 were all 45 degrees, angles 16 of outlets 113 were all 15 degrees, lengths 15 of throats 112 were all 2.54 centimeters, and minimal diameters 12 of throats 112 were all 10.2 centimeters.

Figure 4B:
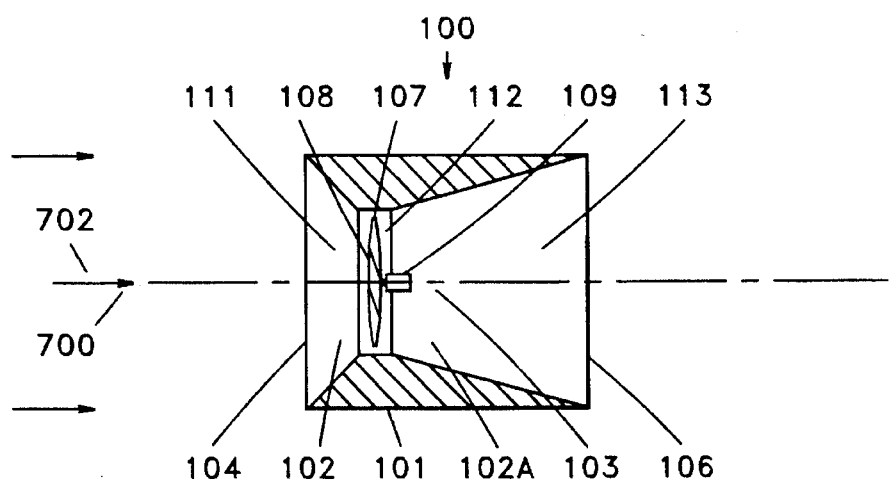
FIG. 4B is a cross-sectional side view of the first-stage venturi tube of FIG. 4A fitted with a turbine drive and generator to form a first-stage venturi power source.
Figure 4C:
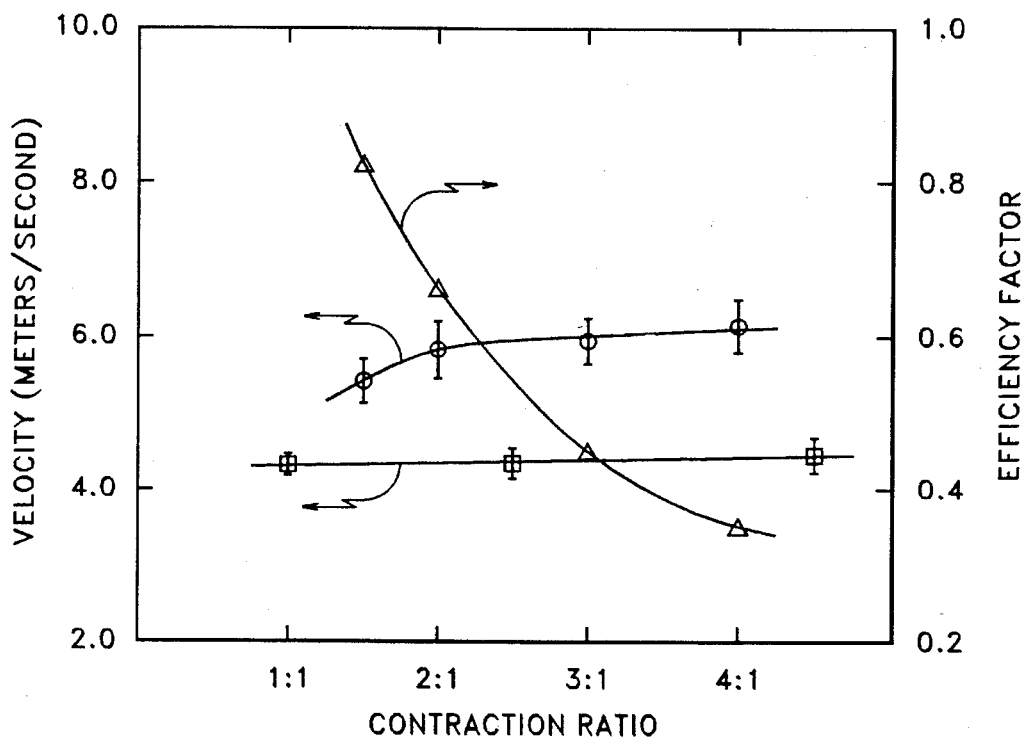
FIG. 4C is a graph of throat velocity (circles) and velocity efficiency factor (triangles) against contraction ratio for the first-stage venturi power source of FIG. 4B.

As shown in FIG. 4C venturi tubes 101 had contraction ratios of 1.5:1, 2:1, 3:1, and 4:1. The data illustrated with squares toward the bottom of FIG. 4C represent tunnel velocities in the test section taken with turbine drive 107 and generator 109 as calibrated anemometer. Of course, these data for tunnel velocity are not actually a function of contraction ratio. Rather their positioning along the abscissa indicates the juncture in the experiments on contraction ratios that data for velocity standards on the tunnel were taken. Accordingly, the data in squares indicate there was a very slight upward drift in tunnel velocity as the experiments proceeded.

The data for throat velocities of venturi power sources 100 in FIG. 4B as a function of contraction ratios are shown in circles toward the middle of FIG. 4C. These data illustrate quite clearly the declining rate of increase in throat velocity above a contraction ratio of, say, 2:1. Finally, in FIG. 4C, the efficiency factor $k_1$ of EQN. 5 in triangles is shown spanning its range from the top left to the bottom right. Here, there is a clear illustration of high efficiency at lower contraction ratios and low efficiency at higher contraction ratios. In other words, the very idea of a venturi power source 100 as a means to convert internal energy of a selected medium to kinetic energy of flow becomes a dilemma. At higher efficiencies, there is little gain in velocity or power due to low contraction ratios. At higher contraction ratios, there is little gain in velocity or power due to low efficiencies.

The second set of experiments on the performance of superventuri apparatus having a power conversion means adjacent the throat of the first-stage is intended to establish how, through the action of pumping, a superventuri power source can begin to overcome the dilemma posed by the contraction ratios and efficiency factors for the simple venturi power source. These experiments were performed with superventuri power source 900 in FIG. 4D together with venturi power source 100 of FIG. 4B as a control in some experiments.

Figure 4D:
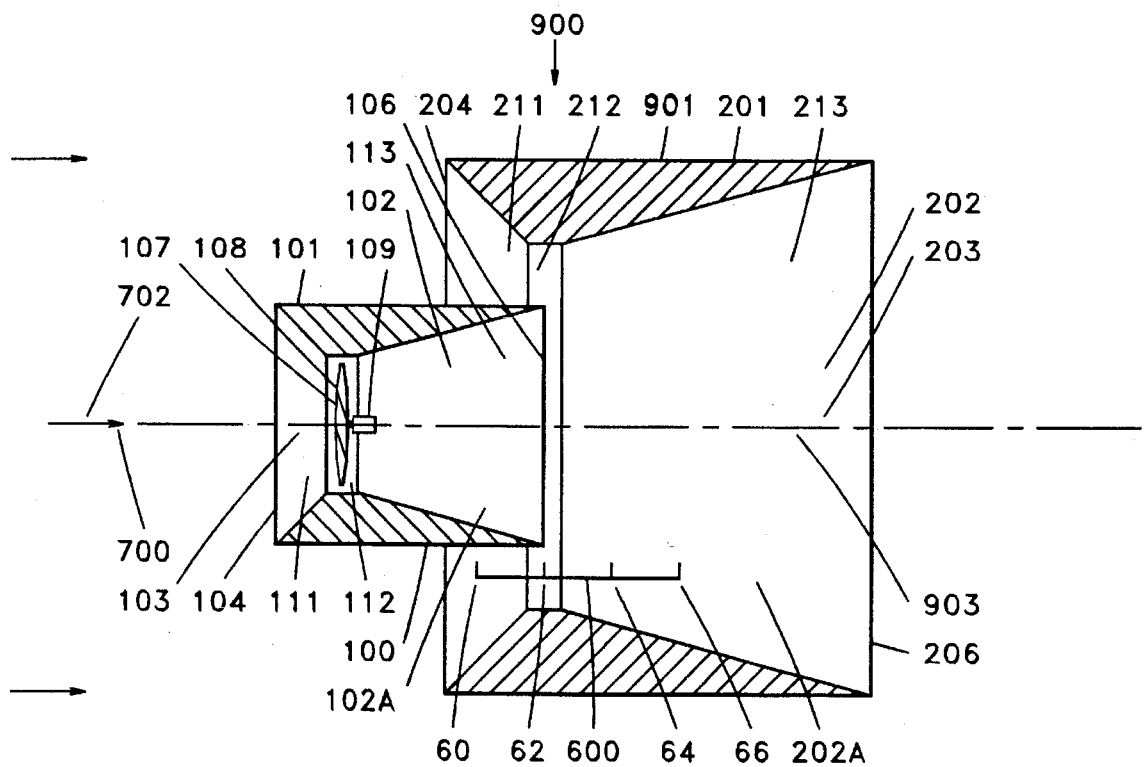
FIG. 4D is a cross-sectional side view of a first-stage venturi power source of FIG. 4B combined with a second-stage venturi tube of FIG. 4A to form a superventuri power source with the exit of the first-stage venturi tube at the longitudinal center of the throat, or the zero position, of the second-stage venturi tube.
Figure 4E:
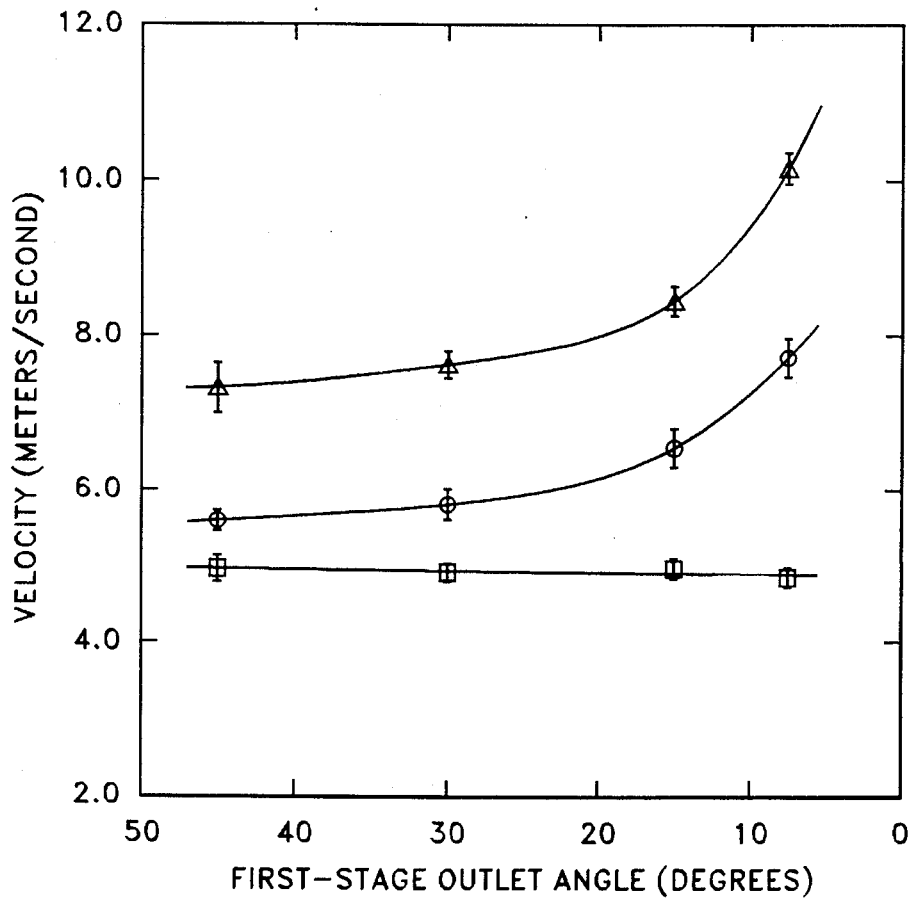
FIG. 4E is a graph of first-stage throat velocity against first-stage outlet angle for the first-stage venturi power source alone (circles) as shown in FIG. 4B and for the superventuri power source with two stages (triangles) as shown in the zero position in FIG. 4D.

For the data presented in FIG. 4E, venturi tubes 101 in FIG. 4B and FIG. 4D had the same set of parameters as stated above for the first set of experiments except that angles 16 of outlets 113 varied while the contraction ratio was fixed at 3:1. Venturi tube 201 in FIG. 4D had its contraction ratio fixed at 2.14, and, as well, all other parameters were also invariant. As illustrated to the right in FIG. 4A, angle 24 of inlet 211 was 45 degrees, angle 26 of outlet 213 was 15 degrees, length 25 of throat 212 was 2.54 centimeters, and minimal diameter 22 of throat 212 was 26.9 centimeters.

As shown in FIG. 4E venturi tubes 101 had angles 16 for outlets 113 of 45, 30, 15, and 7.5 degrees. Once again, the data illustrated with squares toward the bottom of FIG. 4E represent tunnel velocities in the test section taken with turbine 107 and generator 109 as calibrated anemometer. These data are not a function of outlet angle since their positioning along the abscissa indicates the juncture in the experiments on outlet angles that data for velocity standards on the tunnel were taken. Accordingly, the data in squares indicate there was a very slight downward drift in tunnel velocity as the experiments proceeded.

The data for throat velocities for venturi power source 100 of FIG. 4B as a function of angle 16 of outlet 113 are shown in circles toward the middle of FIG. 4E. As expected, these data indicate clearly an acceleration of throat velocity from large to small angle 16 of outlet 113. Finally in FIG. 4E, the data in triangles represent first-stage throat velocity against first-stage outlet angle for two-stage superventuri power source 900 of FIG. 4D. The consistent increase of 30–35 percent in throat velocity for the data in triangles compared to data in circles was taken as a clear indication of probable pumping action by second-stage venturi tube 201 on first-stage venturi tube 101 in superventuri power source 900 of FIG. 4D.

Figure 4F:
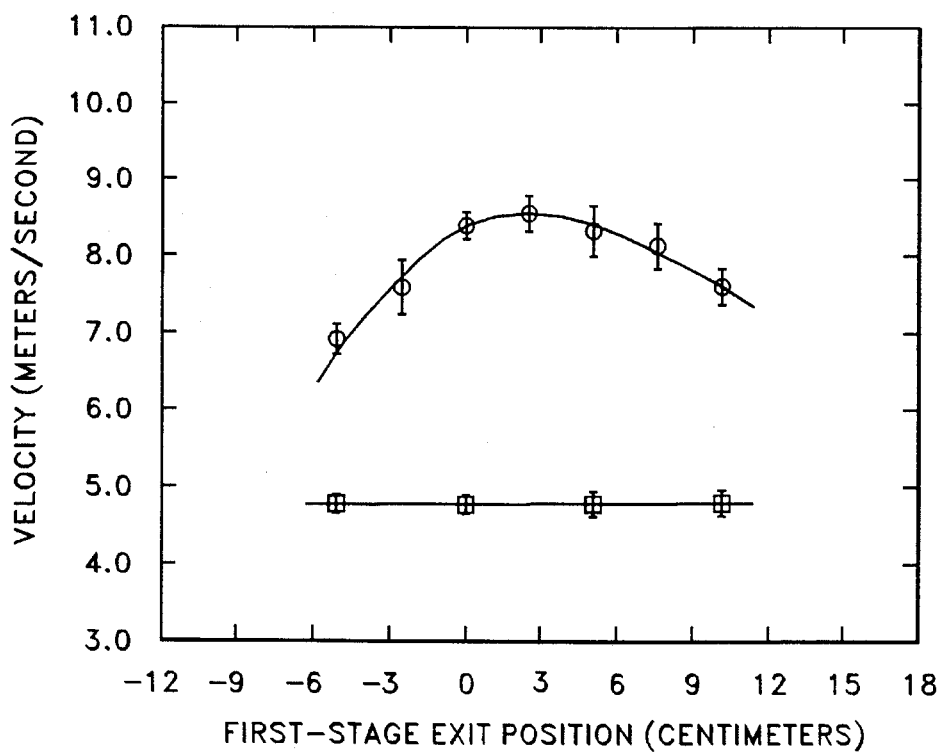
FIG. 4F is a graph of first-stage throat velocity against first-stage position (circles) in a superventuri power source with two stages as illustrated with the scale in FIG. 4D.

The data in FIG. 4F confirm the pumping action by second-stage venturi tube 201 on first-stage venturi tube 101 as configured into superventuri power source 900 in FIG. 4D. Here, the position of exit 106 of venturi tube 101 was varied in relation to the center of throat 212 of second-stage venturi tube 201 as indicated with a scale 600 having a position 60, a position 62, a position 64, and a position 66. As illustrated along the abscissa of FIG. 4F, positions 60, 62, 64, and 66 on scale 600 in FIG. 4D represent the horizontal locations of exit 106 at the −5.08, 0, +5.08, and +10.16 centimeter positions, respectively, relative to the center of throat 212.

For the data presented in FIG. 4F, venturi tube 101 and venturi tube 201 of superventuri power source 900 of FIG. 4D had the same set of parameters as stated above for the previous experiments reported in FIG. 4E except that angle 16 of outlet 113 of venturi tube 101 was fixed at fifteen degrees. Once again, the data points illustrated with squares toward the bottom of FIG. 4F represent tunnel velocities in the test section taken with turbine 107 and generator 109 as calibrated anemometer. These data are not a function of first-stage exit position since their placement along the abscissa indicates the juncture in the experiments on first-stage exit position that data for velocity standards on the tunnel were taken. Accordingly, the data in squares indicate there was virtually no drift in tunnel velocity as the experiments proceeded.

In FIG. 4F the data for throat velocities for venturi tube 101 of superventuri power source 900 as configured in FIG. 4D leave little question regarding the pumping action by venturi tube 201 on venturi tube 101. The maximum in first-stage throat velocity when exit 106 was positioned adjacent the center of throat 212 is quite obvious. Also apparent is the fact that the fall-off from the maximum in first-stage throat velocity was faster when exit 106 was positioned in inlet 211 on the negative side of scale 600 than it was when exit 106 was positioned in outlet 213 on the positive side of scale 600. This has to do with the fact that the rate change toward negative pressure along inlet 211 from entrance 204 to throat 212 was necessarily faster than the rate change toward positive pressure along outlet 213 from throat 212 to exit 206 because angle 24 of inlet 211 was 45 degrees and angle 26 of outlet 213 was 15 degrees.

The fact that the maximum in first-stage throat velocity in FIG. 4F occurred when exit 106 was positioned slightly into outlet 213 marginally on the positive side of scale 600 is taken to be an experimental anomaly probably related to minor surface irregularities in construction of venturi tube 201. Specifically, the juncture of inlet 211 with throat 212 and the juncture of throat 212 with outlet 213 had minor bulges. Too, the sharp unions of these junctures, as contrasted with the more ideal rounded unions may have played a role. Nevertheless, it remains clear that the maximum in first-stage throat velocity in FIG. 4F is adjacent throat 212.

The third and last set of experiments on the performance of a two stage superventuri power source in relation to throat velocity and power of both stages demonstrate how available power can be captured by successively adding turbines to higher stages. These experiments were performed with superventuri power source 900 as configured in FIGS. 1A–1C. For the data presented in FIGS. 1D–1E, venturi tube 101 had a contraction ratio of 4:1. Also, as illustrated to the left in FIG. 4A, angle 14 of inlet 111 was 45 degrees, angle 16 of outlet 113 was either 15 or 7.5 degrees, length 15 of throat 112 was 2.54 centimeters, and minimal diameter 12 of throat 112 was 10.2 centimeters. Venturi tube 201 had a contraction ratio of 2.14:1, and as illustrated to the right in FIG. 4A, angle 24 of inlet 211 was 45 degrees, angle 26 of outlet 213 was 15 degrees, length 25 of throat 212 was 7.62 centimeters, and minimal diameter 22 of throat 212 was 31.0 centimeters. While statistical distributions of data are not included FIGS. 1D–1E, they were similar to those in FIG. 4C and FIGS. 4E–4F.

Figure 1D:
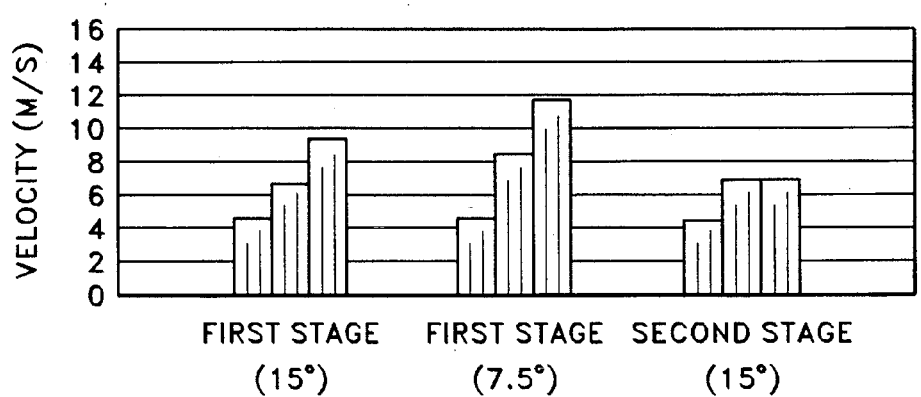
FIG. 1D is a bar graph illustrating, as experimentally determined with a respective turbine drive and generator left-to-right in each triumvirate of bars: the velocity of the wind tunnel alone, the velocity of the throat of the respective stage alone, and the velocity of the throat of the respective stage when both stages are combined into the superventuri power source of FIGS. 1A–1C.

In FIG. 1D the triumvirate of bars to the left in the diagram represent the comparative behavior from left bar to middle bar to right bar, respectively, of: (i) the velocity in the test section of the wind tunnel as determined with first-stage turbine 107 with standard impulse blade 108 and generator 109 as anemometer; (ii) the throat velocity of first-stage venturi power source 100 when taken alone separated from superventuri power source 900 in the test section of the wind tunnel; and (iii) the throat velocity of first-stage venturi power source 100 when coupled to second-stage venturi power source 200 in the form of superventuri power source 900 in the test section of the wind tunnel.

The velocities represented in the middle bar and the right bar of the triumvirate to the left in FIG. 1D were taken when angle 16 of outlet 113 of venturi tube 101 set at 15 degrees. These velocities are qualitatively similar to the velocities illustrated in FIG. 4E with the circle and the triangle, respectively, at a first-stage outlet angle of 15 degrees. More particularly, the velocities in the middle and right bars of FIG. 1D are, respectively, 1.45- and 2.04-times the velocity of air in the tunnel as determined with the anemometer in the left bar.

In FIG. 1D the data in the triumvirate of bars in the middle of the diagram represents exactly the same experiment as the data in the triumvirate of bars to the left in the diagram except that angle 16 of outlet 113 of first-stage venturi tube 101 was 7.5 rather than 15 degrees. Once again, the velocities in the middle bar and right bar in FIG. 1d are qualitatively similar to the velocities illustrated in FIG. 4E with the circle and triangle, respectively, at a first-stage outlet angle of 7.5 degrees. More particularly, the velocities in the middle and right bars of FIG. 1D are, respectively, 1.84- and 2.55-times the velocity of air in the tunnel as determined with the anemometer in the left bar. The increase by 2.55-times from a tunnel velocity of 4.60 meters per second (10.3 mph) to a first-stage velocity of 11.7 meters per second (26.2 mph) was the largest observed for a first-stage venturi power source 100 in a two-stage superventuri power source 900.

In FIG. 1D the triumvirate of bars to the right in the diagram represent the comparative behavior from left bar to middle bar to right bar, respectively, of: (i) the velocity in the test section of the wind tunnel as determined with second-stage turbine 207 with abbreviated impulse blade 208 and generator 209 as anemometer; (ii) the throat velocity of second-stage venturi power source 200 when taken alone separated from superventuri power source 900 in the test section of the wind tunnel; and (iii) the throat velocity of second-stage venturi power source 200 when coupled to first-stage venturi power source 100 in the form of superventuri power source 900 in the test section of the wind tunnel. In FIG. 1D essentially the same data was obtained for second-stage venturi power source 200 whether angle 16 of outlet 113 of first-stage venturi power source 100 was 15 or 7.5 degrees. Accordingly, the data in the triumvirate of bars to the right applies to either of the triumvirates of bars in the left or middle of FIG. 1D. A similar situation exists in FIG. 1E.

The velocity of the anemometer in the left bar of the triumvirate to the right in FIG. 1D is almost identical to the velocities represented in the left bars of the triumvirates to the far left and middle, being only about four (4) percent lower. These small differences in velocity are presumably due to the fact that the air toward the wall of the tunnel which was measured by turbine 207 was moving slightly slower than the air toward the center of the tunnel which was measured by turbine 107.

The velocity represented in the middle bar of the triumvirate to the right in FIG. 1D is qualitatively similar to the velocity represented in the middle bar of the triumvirate to the left. This is as expected since angle 26 of outlet 213 and angle 16 of outlet 113 were both 15 degrees. Also, from FIG. 4C the velocities in the respective middle bars should not be substantially influenced by the difference in contraction ratio of 2.14:1 for second-stage venturi tube 201 and of 4:1 for first-stage venturi tube 101.

The experiments which led to the velocity represented by the right bar of the triumvirate to the right in FIG. 1D reveal a great deal about the current invention. Initially, a turbine similar to turbine 107 with standard impulse blades 108 was used in the throat 212 of second-stage venturi power source 200. This initial configuration is represented in FIG. 5 where turbine 207 has standard impulse blades 288. Like standard impulse blades 108 with radial lengths 18 approaching half the minimal diameter 12 of throat 112 of first-stage venturi tube 101, these standard impulse blades 288 also had radial lengths 88 approaching half the minimal diameter 22 of throat 212 of second-stage venturi tube.

When this arrangement with standard impulse blades 288 alone was used in venturi power source 200 alone in the test section of the tunnel to take the data for the middle bar of the triumvirate to the right in FIG. 1D, a velocity essentially the same as that represented was obtained. However, when this arrangement with standard impulse blades 288 was used in venturi power source 200 pumping on venturi power source 100 of superventuri power source 900 of FIG. 5 in the test section of the tunnel to take the data for the right bar of the triumvirate to the right in FIG. 1D, a velocity essentially half that represented was obtained.

This magnitude of decline in velocity was a complete surprise because the volume of new air entering second-stage venturi tube 201 at the entrance 204 was four times the volume of old air from exit 106 of first-stage venturi tube 101. Initially, in the design stages of the experiment, it was thought that there might be only a slight measured decrease in the velocity at throat 212 because the weighted velocity of four volumes of newly accelerated rapidly moving air from the entrance 204 would overwhelm the weighted velocity of the one volume of more slowly moving old air from exit 106 as the five volumes tended toward equilibration of velocities at throat 212.

At this juncture second-stage turbine 207 with standard impulse blades 288 together with second-stage generator 209 of venturi power source 200 of superventuri power source 900 in FIG. 5 was removed to form a superventuri power source 900 similar to that illustrated in FIG. 4D. Next, the velocity distribution adjacent the exit 106 of first-stage venturi source 100 and the throat 212 of second-stage venturi tube 201 was examined with the Pitot tube. It was found that the velocity of air toward the center of exit 106 near central super-axis 903 was very low, being substantially less than 50 percent of that represented in the middle bar of the triumvirate to the right in FIG. 1D. It was also found that the velocity of air between the wall of exit 106 of first-stage venturi tube 101 and the wall of throat 212 of second-stage venturi tube 201 was substantially equal to the velocity represented in the middle bar of the triumvirate to the right in FIG. 1D.

It was concluded that a separation probably had occurred whereby the larger, faster moving volume of gas between the walls of exit 106 of first-stage venturi tube 101 and of the throat 212 of the second-stage venturi tube 201 was drawing to itself the smaller, slower moving volume of gas from exit 106 of first-stage venturi tube 101. There may have remained a very slowly moving essentially dead volume of air adjacent central super-axis 903 next to exit 106 of first-stage venturi tube 101.

This essentially dead volume of air may have caused resistance to turning of standard impulse blades 288 adjacent throat 212 of venturi power source 200 of superventuri power source 900, and the diminished performance. Accordingly, it was determined that turbine 207 with abbreviated impulse blades 208 for second-stage venturi power source 200 of superventuri power source 900 in FIGS. 1A–1C should be tried. This improvement in design of second-stage turbine 207 with abbreviated blades 208 gave the magnitude of velocity represented by the right bar of the triumvirate to the right in FIG. 1D.

The results in the middle bars in each of the triumvirates of FIG. 1D can be used to calculate the efficiency factors in EQNS. 5 and 3 for first-stage venturi power sources 100 and second-stage venturi power source 200 when they were separated from each other. Then, these efficiency factors can be substituted into EQN. 7 to arrive at predicted velocities for first-stage venturi power source 100 when it was coupled to second-stage venturi power source 200 to form superventuri power source 900. These semi-empirical theoretical velocities from EQN. 7 can then be compared with actual velocities in the right bars of the triumvirates to the left and middle of FIG. 1d for venturi power source 100 of superventuri power source 900.

When this exercise was conducted, semi-empirical theoretical values of 10.4 and 13.2 meters per second were obtained for first-stage venturi power sources 100 of superventuri power source 900 when they had angles 16 of outlet 113 of 15 and 7.5 degrees, respectively. These values may be compared to the experimental values of 9.38 and 11.73 meters per second, respectively, in the right bars of the triumvirates to the left and middle of FIG. 1d. Thus, the experimental values are about 90 percent of the semi-empirical values.

A likely candidate for explaining the experimental shortfall is increased drag in venturi power source 100 of superventuri power source 900. The semi-empirical theoretical values for efficiency factors were obtained when power sources 100 and 200 were separated, and therefore the efficiency factor for first-stage venturi power source 100 was calculated for a lower velocity than that when it was coupled with second-stage venturi power source 200 to form superventuri power source 900. Since drag increases with the cube of velocity, the efficiency factor for coupled first-stage venturi power source 100 should clearly be less than for uncoupled first-stage venturi power source 100. Nonetheless, a 90 percent agreement is taken to mean that the multiplicative approach taken in EQN. 7 may have merit both as descriptive and developmental device.

The results in FIG. 1D can be also be used to calculate the power amplification factor for the superventuri power source 900 of FIGS. 1A–1C using a relationship developed from EQN. 2. The $$F_p = \frac{A_{12}u_{12}^3 + (A_{22} - A_{13})u_{22}^3}{A_{21}u^3} \quad \text{(EQN. 8)}$$

subscripts in EQN. 8 follow the previous convention of association with the diameters in FIG. 4A. The first expression in the numerator of EQN. 8 is the power amplification factor for first-stage venturi power source 100 fully taking into account the inlet parameters for the pumping by second-stage venturi tube 201 in the denominator. The second expression in the numerator is the power amplification factor for second-stage venturi power source 200 taking into account that, in the configuration of FIGS. 1A–1C, power available in the second-stage tends to be concentrated between the exit 106 of first-stage venturi tube 101 and the throat 212 of second-stage venturi tube 201.

Once again, assuming constant density, terms in EQN. 8 include: the power amplification factor, $F_p$, in dimensionless units; the minimal throat and maximal outlet normal cross-sectional areas, $A_{12}$ and $A_{13}$, respectively, of first-stage venturi tube 101 in square meters; the minimal throat and maximal inlet normal cross-sectional areas, $A_{22}$ and $A_{21}$, respectively, of second-stage venturi tube 201 in square meters; the throat velocities, $u_{12}$ and $u_{22}$, respectively, of first- and second-stage venturi power sources 100 and 200 in meters per second; and the inlet velocity, u, for second-stage venturi tube 201 in meters per second.

Substitution of values in EQN. 8 for first-stage venturi power source 100 having angle 16 of outlet 113 of 15 degrees with its velocity given in the right bar in the triumvirate to left of FIG. 1d, and for second-stage venturi power source 200 with its velocity represented in the right bar in the triumvirate to the right yielded a power amplification factor of 1.46. Substitution of values in EQN. 8 for first-stage venturi power source 100 having angle 16 of outlet 113 of 7.5 degrees with its velocity given in the right bar of the triumvirate in the middle of FIG. 1d, and for second-stage venturi power source 200 with its velocity represented in the right bar in the triumvirate to the right yielded a power amplification factor of 1.87. Since both these values were substantially greater than unity, it is concluded that significant power amplification occurred and that this power was substantially available for harvest with turbines 107 with and 207. Too, more stages in superventuri power source 900 may extrapolate to yet higher power amplification factors.

Figure 1E:
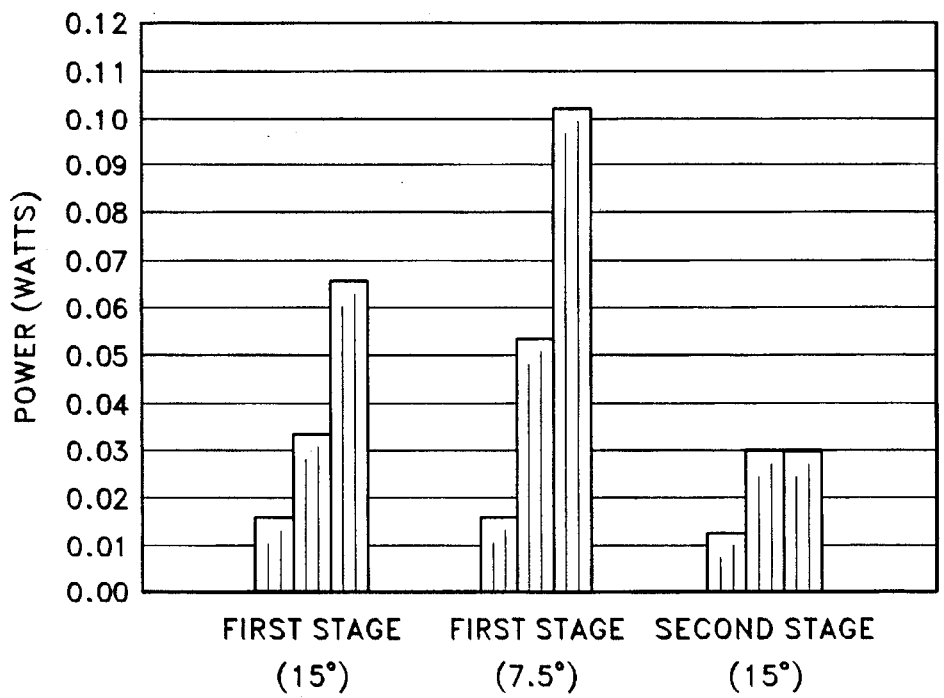
FIG. 1E is a bar graph illustrating, as experimentally determined with a respective turbine drive and generator left-to-right in each triumvirate of bars: power from the wind tunnel alone, power from the throat of the respective stage alone, and power from the throat of the respective stage when both stages are combined into the superventuri power source of FIGS. 1A–1C.

The data represented in the bar graph of FIG. 1E is analogous to that in FIG. 1D except that, rather than the calibrated velocities of FIG. 1D, values for uncalibrated and absolute experimental power as determined from voltage and current measurements from first-stage generator 109 and second-stage generator 209 are presented. Comparison of FIGS. 1D and 1E reveals that the data of the latter exhibits much stronger, exponential increases as expected from EQN. 1 where power is proportional to the cube of velocity. However, for the case of first-stage turbine 107 with standard impulse blades 108 and first-stage generator 109, a comparison of the values for experimental power against theoretically available power from EQN. 1 revealed that only a very small fraction of theoretically available power (0.045–0.017) was converted to measured power. Furthermore, values in this range tended to decrease with increasing power. For the case of second-stage turbine 207 with abbreviated impulse blades 208 and second-stage generator 209, the fraction of theoretically available power converted to measured power was even smaller (0.0078–0.0048), and, once again, the values in this range tended to decrease with increasing power. Presumably, these results can be accounted for by factors such as: (i) the Betz coefficient which yields an upper theoretical limit of $16/27$ of power available for conversion by any turbine; (ii) the respective coefficients of performance of turbines 107 and 207, and the respective efficiencies of generators 109 and 209.

Finally, it is worthwhile noting that in the triumvirate of bars to the right in FIG. 1D, there was no loss of velocity as the transition was made from venturi power source 200 in the middle bar to superventuri power source 900 in the right bar. Thus for this set of circumstances, there was little or no loss in velocity from pumping by second-stage venturi tube 201 on first-stage venturi tube 101 in apparent correspondence with EQN. 7. A similar set of comments apply regarding the triumvirate of bars to the right in FIG. 1E where there was no apparent loss in power.

SCOPE, RAMIFICATIONS, AND CONCLUSIONS

Thus it will be recognized that the present invention relates to enhanced power recovery from the flow of a selected medium. It employs a superventuri power source comprising a series of at least two venturi tubes as an accelerator with a turbine adjacent the throat of at least one venturi tube in a stage subsequent to the first. Beyond this, depending in part upon application, the invention may take many sizes, shapes, and forms. Accordingly, while my above description contains many specificities, these should not be construed as limitations on the scope of the invention, but rather as exemplifications of preferred embodiments thereof. Many other variations are possible.

For example, in the experimental work presented herein the selected medium was composed substantially of air in a wind. Other possibilities include a superventuri power source whereby the selected medium is composed substantially of steam, or of carbon dioxide gas and water vapor as products of combustion, or of a stream of liquid water. Thus, the limit on the selected medium is broad covering the range of materials whereby flow through a superventuri power source may be achieved. It is also worthwhile pointing out that many applications with extant air, gas, or water turbines would presumably benefit in efficiency by refitting with superventuri power sources.

Of course there may be differing requirements as to the absolute smallest size and capacity of the lowest stage of the superventuri power source depending upon the selected medium. One would anticipate, for example, that if the selected medium was a stream of liquid water, the first-stage venturi tube might well have a lesser diameter and capacity than if the selected medium was air in a wind. Upper stages could then be sized accordingly. As well, this line of thought might be extended to cover differing materials and details of construction as required for turbines employed with various selected media. That is, while air and water turbines might possess many similarities, in detail they may be quite distinguishable from one another.

In another related example, the turbines shown in the drawing are all of the impulse type. With this kind of turbine adjacent the throat of a venturi tube where the selected medium has a relatively low pressure and high velocity, the blade or blades of the turning rotor may tend to reduce the velocity of the selected medium converting flow velocity, force, kinetic energy, and power to mechanical velocity, force, kinetic energy, and power of the turning rotor, respectively.

On the other hand, the turbines shown in the drawing might have been of the reaction type such as discussed by Bailey in the *McGraw-Hill Encyclopedia of Technology*. With this type of turbine adjacent the throat of a venturi tube, the jet or jets of the turning rotor, having predetermined directional orientation, introduce a relatively higher pressure second selected medium into the lower pressure first selected medium already flowing through the throat. The reaction to the difference in pressures is measured in terms of enhanced mechanical velocity, force, kinetic energy, and power of the turning rotor. In this case, the first and second selected media may or may not be of the same material and state. Of course, it is also within the scope of the invention to have a turbine which is comprised of a combination of the impulse and reaction types.

In general, therefore, a turbine is a device for producing rotary mechanical power from the flow of a selected medium. A turbine may have only one blade or jet, or it may have many blades or jets, or it may have some combination thereto. In FIGS. 1A–1C, for example, first-stage turbine 107 includes two standard impulse blades 108 together with the hub which attaches blades 108 to each other and to the drive shaft of first-stage generator 109. Second-stage turbine 207 includes two abbreviated impulse blades 208 together with thin connectors 210 which, as parts of the rotor, connect blades 208 to the drive shaft of second-stage generator 209.

Figure 6:
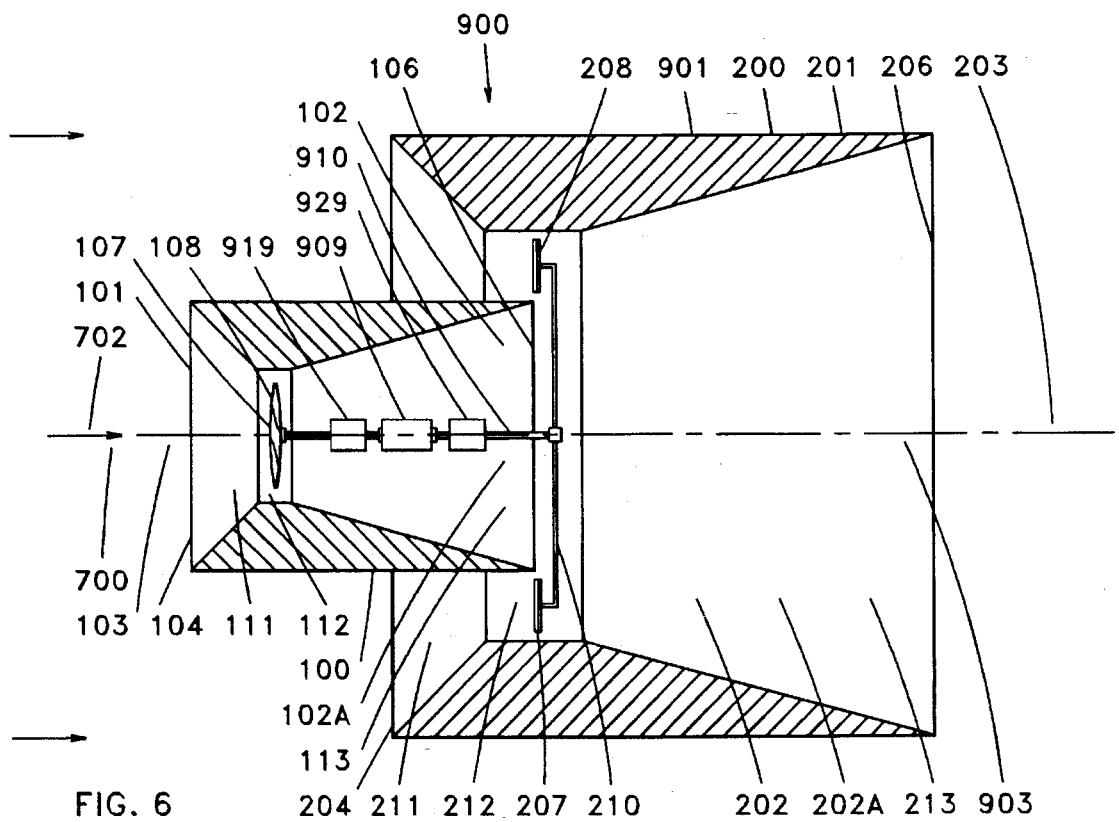
FIG. 6 is a cross-sectional side view of an additional superventuri power source of the present invention similar to that in FIGS. 1A–1C except that the first- and second-stage turbines drive a single generator through separate transmissions.

Since the generators 109 and 209 and their drive shafts are not included in the definition of a turbine in FIG. 1C, then it is readily seen that, for the purposes of the present invention, the arrangement in FIG. 6 is quite equivalent to that in FIG. 1C. In FIG. 6 rather than having separate generators for each stage, there is a central generator 909 serving both stages. In this configuration, first-stage turbine 107 is joined to central generator 909 via a first-stage transmission 919, and second-stage turbine 207 is also joined to central generator 909 via a second-stage transmission 929. Furthermore, in these illustrations generators 109, 209, and 909 could as well be air compressors, water pumps, or the like.

Still another example of the scope of the present invention relates to whether the superventuri power source is stationary or moving. The drawing and discussion to this point may all seem to imply a stationary superventuri power source. However, this need not be the case as a small superventuri power source might be mounted on a moving automobile, airplane, or boat, and if pointed into the direction of motion, could serve as a generator, pump, or speedometer or the like. In the case of a boat, the selected medium might be either air or water drawn through the superventuri power source by the motion.

Too, a larger superventuri power source could serve as a propulsion means. In a sailing vessel, for example, the superventuri power source might replace the sails. Presumably, the superventuri power source would be pointed directly into the wind so that power from its turbine or turbines could drive the propulsion means of the vessel. However, simultaneously steering the vessel into the wind in this manner would prove inopportune so that the familiar tacking maneuver would have to be employed.

As to the venturi tubes comprising a superventuri apparatus, previous concern has rested primarily with circular or annular tubes. However, except as stated specifically in the appended claims, the detailed external and internal characteristics including materials of construction of the substantially hollow conduits housing venturi tubes are not limiting to the invention disclosed herein. Hence, singly or in combination, the external and internal shapes of venturi tubes included in a superventuri apparatus may be irregular, or they may be common and regular such as round, oval, square, rectangular, hexagonal or the like. Too, singly or in combination, the exterior and interior joints may or may not be smooth and rounded.

An example of permissible dimensional disparity in superventuri apparatuses may be found in a comparison of this drawing of the invention and that in Bloch's Brevet Patent. To accomplish this comparison, the dimensional scheme of the illustration to the left in FIG. 4A herein is used as representative of each venturi tube in a superventuri apparatus. Accordingly, FIGS. 1A–1C herein illustrate a superventuri apparatus where each venturi tube has a maximal diameter 11 of inlet 111 equal to maximal diameter 13 for outlet 113. In contrast, Bloch illustrated a superventuri apparatus where each venturi tube excepting that in the last stage had a maximal diameter 11 of inlet 111 greater than the maximal diameter 13 of outlet 113. Once again, FIGS. 1A–1C show an apparatus where each venturi tube has a nonzero length 15 for throat 112 of a venturi tube. In contrast, Bloch showed an apparatus where each venturi tube had a zero length 15 for throat 112. Still again, FIGS. 1A–1C present an apparatus where the internal and external portions of the conduit housing the outlet 113 of the final stage are not flared. In contrast, Bloch presented an apparatus where the internal and external portions of the conduit housing the outlet of the final stage were flared. Therefore, in a given application, the most suitable size, shape, and form, as well as the materials construction, of the components comprising a superventuri apparatus, and that of the resultant superventuri power source itself, may be determined through conventional experimentation. In a similar manner the best direct or indirect method of positioning and retaining components relative to each other in a superventuri power source may also be determined through conventional experimentation. As an example of the latter, it is conceivable that an abbreviated impulse blade 208 in FIGS. 1A–1C might be attached to a turning annular ring which also serves as a portion of outlet 113.

A similar set of comments may be made regarding duct 962 employed as a flow conveyor which generally encloses superventuri power source 900 at least from about the front 964 to about the back 966 which contains the flow of the selected medium through the superventuri power source 900 as illustrated in FIG. 2. The flow conveyor might instead be a tube, pipe, fairing or the like. For a duct, tube, or pipe the flow conveyor might extend well forward of front 964 and well rearward of back 966 as implied in FIG. 2. For a fairing such as that which surrounds the familiar jet engine the flow conveyor might extend from only about front 964 to about back 966. The flow conveyor may be regular in shape such round, oval, square, rectangular, hexagonal, or the like; or it may be irregular in shape; or may be thin-walled or thick-walled as suitable, say, for low pressure and temperature operation or for high pressure and temperature operation, respectively. It may or may not have advantageous aerodynamic characteristics. Too, the manner in which superventuri power source 900 in FIG. 2 is attached to the flow conveyor is also open. The method of attachment might be tight as illustrated in FIG. 2 where the outer wall of the last stage of superventuri apparatus 901 is form fit to the inner wall of the flow conveyor, or it might be loose where there is a space between the outer wall of the last stage of superventuri apparatus 901 and the inner wall of the flow conveyor. Finally, FIG. 2 illustrates a superventuri power source 900 and the flow conveyor which are rigid and straight. Although it would be less preferred from the perspective of drag, they could be supple and bent by, say, 90 degrees in the middle of diagram in the manner that a hose is bent. Here, the tests of suitability rest with whether or not inlets 111 and 211 of venturi tubes 101 and 201 still face intended direction of flow 700 of the selected medium and whether or not central super-axis 903 falls along intended line of flow 702 of the selected medium.

While the accompanying drawings illustrate superventuri power sources having only either two or three venturi tubes, and while the appended claims refer to superventuri power sources having a series of at least two venturi tubes, these facts should not be construed to imply that the best manifestations of the current invention may involve only two or three venturi tubes. Indeed, the optimal number of venturi tubes for a superventuri power source under a given set of circumstances can be determined through conventional experimentation and judicious selection.

Within the limits of the appended claims, the phrase, power source, should be interpreted broadly. On a smaller size scale, the invention might provide rotary mechanical rotary power to drive one or more generators on an anemometer or other type of flowmeter with enhanced range and thereby sensitivity. On an intermediate size scale, the invention might provide enough rotary mechanical power to drive one or more generators or water pumps sufficient for the purposes of a farm family. On a larger size scale, the invention might provide enough rotary mechanical power to drive one or more generators to provide electricity sufficient for the purposes of a community of people.

Regarding the theory outlined in EQNS. 1–8, and any accompanying discussion, the invention is not bound by the path of theory or the resultant theory itself. Other starting points and other pathways, theoretical or purely empirical, could lead to a similar invention. More specifically, EQN. 7 is offered to promote discourse on possible refinements as to the detailed dynamics of the invention. Too, in reference to power amplification, there may be alternatives to EQNS. 2 and 8. Finally, the data in FIGS. 1D–1E, FIG. 4C, and FIGS. 4E–4F are offered as results for representative experiments under a given set of circumstances. Better experiments under more carefully controlled conditions may yield superior data.

Lastly, especially under circumstances where a non-reactive selected medium such as air or water is employed, the technology described may be viewed as already relatively benign in the environment. However, superventuri power source 900 in FIGS. 1A–1C, for example, might be made even more benign if inlets 111 and 211, or outlets 113 and 213, or both were screened to protect birds or fish or the like from turbines 107 and 108. Too, superventuri power source 900 itself might be protected from storms if inlets 111 and 211 were capable of being closed-off with shaped covers.

Accordingly, the scope of the invention should be determined not by the embodiments, theory, and data presented, but the appended claims and their legal equivalents.

What is claimed is:

1. A superventuri power source comprising:
   a. a series of at least two venturi tubes whereof each of the venturi tubes includes a central axis through a substantially hollow conduit having a venturi constriction; and wherein the venturi constriction includes an inlet of nonzero length and generally decreasing normal cross-sectional area which leads to a throat of generally minimal normal cross-sectional area which, in turn, leads to an outlet of nonzero length and generally increasing normal cross-sectional area; and whereby each normal cross-sectional area is perpendicular to its respective central axis;
   b. a superventuri apparatus including: (i) at least one twosome in the series of at least two venturi tubes labeled an alpha- and a beta-venturi tube, respectively, and of predetermined successively increasing flow capacity, respectively; (ii) the substantially hollow conduit of the alpha-venturi tube having an open entrance and an open exit adjacent its inlet and outlet, respectively, to permit flow of a selected medium through the open entrance into the venturi constriction and out of the open exit; (iii) the respective inlets of the twosome each facing the intended direction of flow of the selected medium; (iv) the open exit of the alpha-venturi tube being placed adjacent the throat of the beta-venturi tube in a manner that the respective central axes of the twosome essentially merge into a central super-axis along an intended line of flow of the selected medium; and (v) as referenced from the super-axis, the inlets of the alpha- and beta-venturi tubes being positioned to intercept relatively inner and outer portions of the selected medium as an alpha- and a beta-flow, respectively, whereby the alpha-flow as exhaust from the open exit of the alpha-venturi tube joins the accelerated beta-flow adjacent the throat of the beta-venturi tube causing a pumping action by the beta-venturi tube on the alpha-venturi tube; and
   c. a beta-turbine adjacent the throat of the beta-venturi tube wherein the beta-turbine includes at least one impulse blade comprising a top and a bottom with the radial length between the top and the bottom being less than about three-fourths the minimal distance between the central super-axis and the closest limit of the throat of the beta-venturi tube to recover useful rotary mechanical power from flow power of the selected medium.

2. The superventuri power source of claim 1 whereby the normal pumping cross-sectional area of the beta-venturi tube, which is defined as the difference between the maximal normal cross-sectional area of the inlet of the beta-venturi tube and the maximal normal cross-sectional area of the inlet of the alpha-venturi tube, is at least as great as the maximal normal cross-sectional area of the inlet of the alpha-venturi tube.

3. The superventuri power source of claim 1 whereby the contraction ratio of the alpha-venturi tube, defined as the ratio between the maximal normal cross-sectional area of the inlet and the minimal normal cross-sectional area of the throat of the alpha-venturi tube, is greater than the respective contraction ratio of the beta-venturi tube.

4. The superventuri power source of claim 1 whereby the angle of the outlet of the alpha-venturi tube is less than the angle of the outlet of the beta-venturi tube.

5. The superventuri power source of claim 1 which also includes an alpha-turbine adjacent the throat of the alpha-venturi tube to recover yet more useful rotary mechanical power from flow power of the selected medium.

6. The superventuri power source of claim 1 whereby the selected medium is composed substantially of air in a wind.

7. The superventuri power source of claim 1 whereby the selected medium is composed substantially of a stream of liquid water.

8. The superventuri power source of claim 1 wherein:
   a. the alpha- and beta-venturi tubes of the twosome are annular and positioned concentrically along the central super-axis which is linear;
   b. the minimal diameter for the throat of the beta-venturi tube is greater than the maximal diameter for the open exit of the alpha-venturi tube;
   c. the impulse blade of the beta-turbine is an abbreviated impulse blade with radial length between the top and the bottom approximating half the difference between the minimal diameter for the throat of the beta-venturi tube and the maximal diameter for the open exit of the alpha-venturi tube; and
   d. the rotation radii for the top and the bottom of the abbreviated impulse blade normal to the central super-axis are approximately half the minimal diameter for the throat of the beta-venturi tube and half the maximal diameter for the open exit of the alpha-venturi tube, respectively.

9. A superventuri power source comprising:
   a. a series of at least two venturi tubes whereof each of the venturi tubes includes a central axis through a substantially hollow conduit having a venturi constriction; and wherein the venturi constriction includes an inlet of nonzero length and generally decreasing normal cross-sectional area which leads to a throat of generally minimal normal cross-sectional area which, in turn, leads to an outlet of nonzero length and generally increasing normal cross-sectional area; and whereby each normal cross-sectional area is perpendicular to its respective central axis;
   b. a superventuri apparatus including: (i) at least one twosome in the series of at least two venturi tubes labeled an alpha- and a beta-venturi tube, respectively, and of predetermined successively increasing flow capacity respectively; (ii) the substantially hollow conduit of the alpha-venturi tube having an open entrance and an open exit adjacent its inlet and outlet, respectively, to permit flow of a selected medium through the open entrance into the venturi constriction and out of the open exit; (iii) the respective inlets of the twosome each facing the intended direction of flow of the selected medium; (iv) the throat of the beta-venturi tube having nonzero length and generally constant minimal normal cross-sectional area with the open exit of the alpha-venturi tube being placed adjacent the throat of the beta-venturi tube in a manner that the respective central axes of the twosome essentially merge into a central super-axis along an intended line of flow of the selected medium; and (v) as referenced from the super-axis, the inlets of the alpha- and beta-venturi tubes being positioned to intercept relatively inner and outer portions of the selected medium as an alpha- and a beta-flow, respectively, whereby the alpha-flow as exhaust from the open exit of the alpha-venturi tube joins the accelerated beta-flow adjacent the throat of the beta-venturi tube causing a pumping action by the beta-venturi tube on the alpha-venturi tube; and
   c. a beta-turbine adjacent the throat of the beta-venturi tube to recover useful rotary mechanical power from flow power of the selected medium.

10. The superventuri power source of claim 9 whereby the contraction ratio of the alpha-venturi tube, defined as the ratio between the maximal normal cross-sectional area of the inlet and the minimal normal cross-sectional area of the throat of the alpha-venturi tube, is greater than the respective contraction ratio of the beta-venturi tube.

11. The superventuri power source of claim 9 whereby the angle of the outlet of the alpha-venturi tube is less than the angle of the outlet of the beta-venturi tube.

12. The superventuri power source of claim 9 wherein:
   a. the alpha- and beta-venturi tubes of the twosome are annular and positioned concentrically along the central super-axis which is linear;
   b. the minimal diameter for the throat of the beta-venturi tube is greater than the maximal diameter for the open exit of the alpha-venturi tube;
   c. the beta-turbine includes at least one abbreviated impulse blade comprising a top and a bottom with radial length between the top and the bottom approximating half the difference between the minimal diameter for the throat of the beta-venturi tube and the maximal diameter for the open exit of the alpha-venturi tube; and
   d. the rotation radii for the top and the bottom of the abbreviated impulse blade normal to the central super-axis are approximately half the minimal diameter for the throat of the beta-venturi tube and half the maximal diameter for the open exit of the alpha-venturi tube, respectively.

13. A superventuri power source comprising:
   a. a series of at least two venturi tubes whereof each of the venturi tubes includes a central axis through a substantially hollow conduit having a venturi constriction; and wherein the venturi constriction includes an inlet of nonzero length and generally decreasing normal cross-sectional area which leads to a throat of generally minimal normal cross-sectional area which, in turn, leads to an outlet of nonzero length and generally increasing normal cross-sectional area; and whereby each normal cross-sectional area is perpendicular to its respective central axis;
   b. a superventuri apparatus including: (i) at least one twosome in the series of at least two venturi tubes labeled an alpha- and a beta-venturi tube, respectively, and of predetermined successively increasing flow capacity, respectively; (ii) the substantially hollow conduit of the alpha-venturi tube having an open entrance and an open exit adjacent its inlet and outlet, respectively, to permit flow of a selected medium through the open entrance into the venturi constriction and out of the open exit; (iii) the respective inlets of the twosome each facing the intended direction of flow of the selected medium; (iv) the open exit of the alpha-venturi tube being placed adjacent the throat of the beta-venturi tube in a manner that between a front and a back of the apparatus the respective central axes of the twosome essentially merge into a central super-axis along an intended line of flow of the selected medium; and (v) as referenced from the super-axis, the inlets of the alpha- and beta-venturi tubes being positioned to intercept relatively inner and outer portions of the selected medium as an alpha- and a beta-flow, respectively, whereby the alpha-flow as exhaust from the open exit of the alpha-venturi tube joins the accelerated beta-flow adjacent the throat of the beta-venturi tube causing a pumping action by the beta-venturi tube on the alpha-venturi tube;

c. a beta-turbine adjacent the throat of the beta-venturi tube to recover useful rotary mechanical power from flow power of the selected medium; and d. a flow conveyor which generally encloses the superventuri power source at least from about the front to about the back of the apparatus and which serves to contain the flow of the selected medium through the superventuri power source.

14. The superventuri power source of claim 13 whereby the normal pumping cross-sectional area of the beta-venturi tube, which is defined as the difference between the maximal normal cross-sectional area of the inlet of the beta-venturi tube and the maximal normal cross-sectional area of the inlet of the alpha-venturi tube, is at least as great as the maximal normal cross-sectional area of the inlet of the alpha-venturi tube.

15. The superventuri power source of claim 13 whereby the contraction ratio of the alpha-venturi tube, defined as the ratio between the maximal normal cross-sectional area of the inlet and the minimal normal cross-sectional area of the throat of the alpha-venturi tube, is greater than the respective contraction ratio of the beta-venturi tube.

16. The superventuri power source of claim 13 whereby the angle of the outlet of the alpha-venturi tube is generally less than the angle of the outlet of the beta-venturi tube.

17. The superventuri power source of claim 13 which also includes an alpha-turbine adjacent the throat of the alpha-venturi tube to recover yet more useful rotary mechanical power from flow power of the selected medium.

18. The superventuri power source of claim 13 whereby the selected medium is composed substantially of steam.

19. The superventuri power source of claim 13 whereby the selected medium is composed substantially of carbon dioxide gas and water vapor as products of combustion.

20. The superventuri power source of claim 13 wherein:

a. the alpha- and beta-venturi tubes of the twosome are annular and positioned concentrically along the central super-axis which is linear;

b. the minimal diameter for the throat of the beta-venturi tube is greater than the maximal diameter for the open exit of the alpha-venturi tube;

c. the beta-turbine includes at least one abbreviated impulse blade comprising a top and a bottom with radial length between the top and the bottom approximating half the difference between the minimal diameter for the throat of the beta-venturi tube and the maximal diameter for the open exit of the alpha-venturi tube; and d. the rotation radii for the top and the bottom of the abbreviated impulse blade normal to the central super-axis are approximately half the minimal diameter for the throat of the beta-venturi tube and half the maximal diameter for the open exit of the alpha-venturi tube, respectively.

* * * * *